United States Patent
Ikeda et al.

(10) Patent No.: US 9,162,477 B2
(45) Date of Patent: Oct. 20, 2015

(54) IMAGE PROCESSING APPARATUS, PRINTING APPARATUS, AND IMAGE PROCESSING METHOD

(75) Inventors: Tohru Ikeda, Yokohama (JP); Ryosuke Iguchi, Kawasaki (JP); Nobutaka Miyake, Yokohama (JP); Akitoshi Yamada, Yokohama (JP); Mitsuhiro Ono, Tokyo (JP); Fumitaka Goto, Tokyo (JP); Hidetsugu Kagawa, Kawasaki (JP); Tomokazu Ishikawa, Kawasaki (JP); Junichi Nakagawa, Tokyo (JP); Senichi Saito, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 838 days.

(21) Appl. No.: 12/966,769

(22) Filed: Dec. 13, 2010

(65) Prior Publication Data

US 2012/0081442 A1    Apr. 5, 2012

(30) Foreign Application Priority Data

Oct. 5, 2010 (JP) .................. 2010-225747

(51) Int. Cl.
- *B41J 2/205* (2006.01)
- *B41J 2/21* (2006.01)
- *H04N 1/60* (2006.01)

(52) U.S. Cl.
CPC ............ *B41J 2/2146* (2013.01); *H04N 1/6038* (2013.01)

(58) Field of Classification Search
None
See application file for complete search history.

(56) References Cited

U.S. PATENT DOCUMENTS 6,025,929 A   2/2000  Nakajima et al.
6,474,768 B1 * 11/2002  Yano et al. ............. 347/19
6,814,420 B2  11/2004  Fujita et al.
7,034,844 B2  4/2006   Akiyama et al.

(Continued)

FOREIGN PATENT DOCUMENTS

JP   10-13674       1/1998
JP   2000-301807   10/2000

OTHER PUBLICATIONS

Handbook of Color Science, second edition, edited by the Color Science Association of Japan, Published by University of Tokyo Press, 1998. (Partial Translation).
U.S. Appl. No. 12/966,823, filed Dec. 13, 2010. Applicants: Akitoshi Yamada, et al.
U.S. Appl. No. 12/966,781, filed Dec. 13, 2010. Applicants: Fumitaka Goto, et al.

(Continued)

*Primary Examiner* — Uyen Chau N Le
*Assistant Examiner* — Chad Smith
(74) *Attorney, Agent, or Firm* — Fitzpatrick, Cella, Harper & Scinto

(57) ABSTRACT

Area information is obtained with respect to a specified color and nozzle position having color unevenness. Then, coordinate information indicating a nozzle position corresponding to the above area information is obtained in a printing head or nozzle array corresponding to an ink color relating to the specified color information. Next, the number of candidate correction values or candidate patches is obtained on the basis of nozzle coordinates obtained corresponding to the area, by referring to a table. In this table, for example, the number of candidate correction values is small at a nozzle position where an effect due to the variations of nozzle ejection characteristics such as a nozzle ejection volume is small and a change direction is constant, and the number of candidate correction values is large at a nozzle position where an effect due to variations of nozzle ejection characteristics is large.

12 Claims, 25 Drawing Sheets

(56) References Cited

U.S. PATENT DOCUMENTS

| | | |
|---|---|---|
| 7,075,679 B2 | 7/2006 | Goto et al. |
| 7,079,152 B2 | 7/2006 | Akiyama et al. |
| 7,145,693 B2 | 12/2006 | Kagawa |
| 7,266,239 B2 | 9/2007 | Akiyama et al. |
| 7,274,491 B2 | 9/2007 | Yamada et al. |
| 7,339,703 B2 | 3/2008 | Kagawa |
| 7,342,684 B2 | 3/2008 | Imafuku et al. |
| 7,411,707 B2 | 8/2008 | Ikeda |
| 7,639,399 B2 | 12/2009 | Ikeda |
| 7,643,178 B2 | 1/2010 | Yamada et al. |
| 7,684,063 B2 | 3/2010 | Fujita et al. |
| 7,750,921 B2 | 7/2010 | Akiyama et al. |
| 7,912,280 B2 | 3/2011 | Miyagi et al. |
| 8,616,668 B2 * | 12/2013 | Saito et al. ............ 347/15 |
| 2007/0146752 A1 | 6/2007 | Iguchi |
| 2008/0144060 A1 | 6/2008 | Ishikawa |
| 2008/0239353 A1 | 10/2008 | Hori et al. |
| 2008/0239355 A1 | 10/2008 | Goto et al. |
| 2008/0239410 A1 | 10/2008 | Hashii et al. |
| 2009/0034838 A1 | 2/2009 | Umeda et al. |
| 2011/0038020 A1 | 2/2011 | Kagawa |

OTHER PUBLICATIONS

U.S. Appl. No. 12/966,799, filed Dec. 13, 2010. Applicants: Tomokazu Ishikawa, et al.

U.S. Appl. No. 12/962,895, filed Dec. 8, 2010. Applicants: Junichi Nakagawa, et al.

U.S. Appl. No. 12/962,889, filed Dec. 8, 2010. Applicants: Hiroyuki Sakai, et al.

U.S. Appl. No. 12/962,875, filed Dec. 8, 2010. Applicants: Kiyoshi Umeda, et al.

U.S. Appl. No. 12/966,757, filed Dec. 13, 2010. Applicants: Makoto Torigoe, et al.

U.S. Appl. No. 12/966,848, filed Dec. 13, 2010. Applicants: Senichi Saito, et al.

U.S. Appl. No. 12/966,265, filed Dec. 13, 2010. Applicants: Nobutaka Miyake, et al.

U.S. Appl. No. 12/966,837, filed Dec. 13, 2010. Applicants: Mitsuhiro Ono, et al.

U.S. Appl. No. 12/966,743, filed Dec. 13, 2010. Applicants: Ryosuke Iguchi, et al.

U.S. Appl. No. 13/019,253, filed Feb. 1, 2011. Applicants: Arata Miyagi, et al.

* cited by examiner

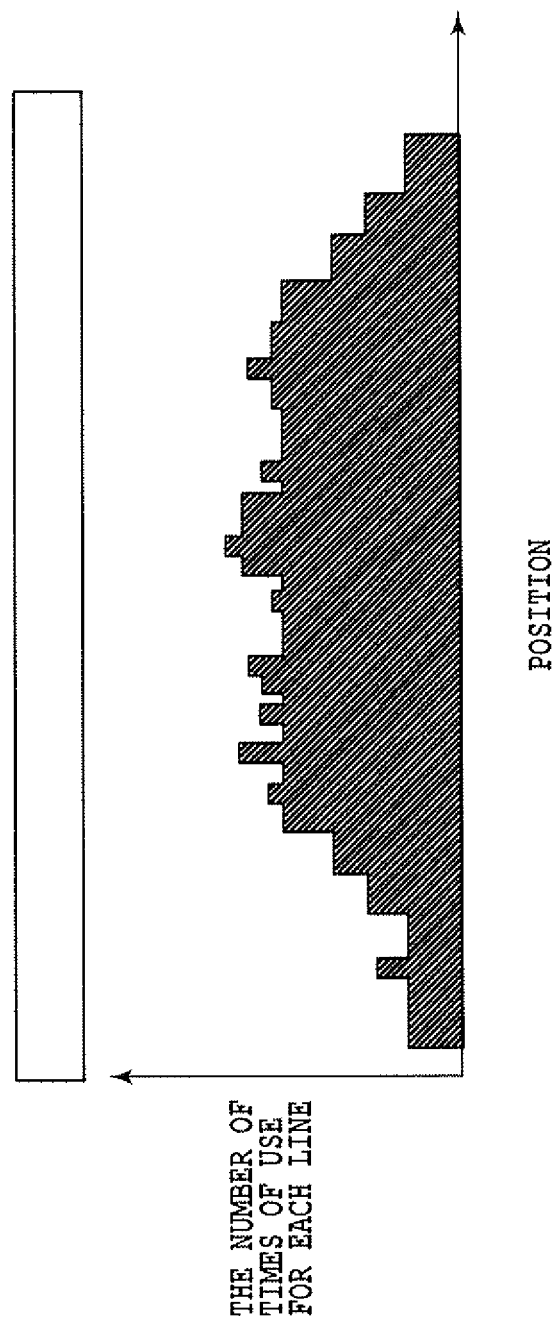

IMAGE PROCESSING APPARATUS, PRINTING APPARATUS, AND IMAGE PROCESSING METHOD

BACKGROUND OF THE INVENTION

1. Field of the Invention

The present invention relates to an image processing apparatus, a printing apparatus and an image processing method, and more particularly, to image processing for reducing a density unevenness caused by ink ejection volume variations among a plurality of nozzles that eject ink.

2. Description of the Related Art

A printing head used in an inkjet printing apparatus may have ink ejection volume variations among a plurality of nozzles due to, for example, a manufacturing error. Such ink ejection volume variations are likely to cause a density unevenness in a printed image.

It has been well known to employ head shading technique as described in Japanese Patent Laid-Open No. 1110-013674 (1998) in order to reduce such a density unevenness. The head shading corrects image data, based on information about an ink ejection volume of each nozzle. This correction increases or decreases the number of ink dots eventually printed, thereby adjusting a density of the printed image.

However, even by using the head shading, when a certain color is represented by overlapping two or more inks, there may occur a color difference, that is, a color printed with nozzles having ink ejection volume variations is different from the color that should be printed. For example, when a blue image is printed by the dots of cyan ink and the dots of magenta ink, the dots of magenta ink are formed in bigger size than a standard size in a region where a magenta ink ejection volume is more than a standard volume due to the variations. Along with this, the number of the dots is less than a standard number by correction of head shading. As a result, cyan dots, as well as dots each being composed of a blue area and a magenta area surrounding the blue area exit in this region. A color of this region is different from the color that should be printed, that is, the color of the region where blue dots are printed by cyan and magenta ink without ink ejection volume variations.

SUMMARY OF THE INVENTION

The object of the present invention is to provide an image processing apparatus, a printing apparatus, and an image processing method that can reduce a color difference due to printing characteristic variations among a plurality of nozzles when an image is printed with a plurality types of inks.

In a first aspect of the present invention, there is provided an image processing apparatus that generates parameters used for correcting image data when generating print data used for printing which a printing unit performs by using a printing head provided with a plurality of nozzle arrays that eject different colors of inks based on the image data, the apparatus comprising: an obtaining unit configured to obtain color information to be corrected and nozzle position information corresponding to respective one or plurality of nozzles in each of a plurality of nozzle arrays, the respective one or plurality of nozzles ejecting different colors of inks to a common area of a printing medium to create the color to be corrected; a patch printing control unit configured to generate a plurality of candidate correction values for correcting the color to be corrected, based on the color information and the nozzle position information obtained by the obtaining unit, and cause the printing unit to print a plurality of patches of candidate colors, which are obtained by correcting the color to be corrected with respective plurality of candidate correction values, in contrast with a color to be printed by respective one or plurality of nozzles which are other than the respective one or plurality of nozzles corresponding to the obtained nozzle position information and eject different colors of inks to a common area of the printing medium; an input unit configured to receive an input of specifying one or plurality of patches from the plurality of patches of candidate colors; and a generating unit configured to generate the parameter used for correcting the image data of pixel area corresponding to the obtained nozzle position information, based on the candidate correction value corresponding to the specified patch, wherein the patch printing control unit causes the printing unit to print the patches of candidate colors the number of which corresponds to the obtained nozzle position.

In a second aspect of the present invention, there is provided an image processing apparatus that generates parameters used for correcting image data when generating print data used for printing which a printing unit performs by using a printing head provided with a plurality of nozzle arrays that eject different colors of inks based on the image data, the apparatus comprising: an obtaining unit configured to obtain color information to be corrected and nozzle position information corresponding to respective one or plurality of nozzles in each of a plurality of nozzle arrays, the respective one or plurality of nozzles ejecting different colors of inks to a common area of a printing medium to create the color to be corrected; a patch printing control unit configured to generate a plurality of candidate correction values for correcting the color to be corrected, based on the color information and the nozzle position information obtained by the obtaining unit, and cause the printing unit to print a plurality of patches of candidate colors, which are obtained by correcting the color to be corrected with respective plurality of candidate correction values, in contrast with a color to be printed by respective one or plurality of nozzles which are other than the respective one or plurality of nozzles corresponding to the obtained nozzle position information and eject different colors of inks to a common area of the printing medium; a interface unit configured to display patches the number of which is the same as the number of printed patches of candidate colors; an input unit configured to receive an input of specifying one or plurality of patches from the plurality of patches of candidate colors through the interface unit; and a generating unit configured to generate the parameter used for correcting the image data of pixel area corresponding to the obtained nozzle position information, based on the candidate correction value corresponding to the specified patch, wherein the patch printing control unit causes the printing unit to print the patches of candidate colors the number of which corresponds to the obtained nozzle position.

In a third aspect of the present invention, there is provided a printing apparatus that generates print data used for printing which a printing unit performs by using a printing head provided with a plurality of nozzle arrays that eject different colors of inks, based on image data, and correct the image data with parameters for correcting the image data when generating the printing data, the apparatus comprising: an obtaining unit configured to obtain color information to be corrected and nozzle position information corresponding to respective one or plurality of nozzles in each of a plurality of nozzle arrays, the respective one or plurality of nozzles ejecting different colors of inks to a common area of a printing medium to create the color to be corrected; a patch printing control unit configured to generate a plurality of candidate correction values for correcting the color to be corrected, based on the color information and the nozzle position information obtained by the obtaining unit, and cause the printing unit to print a plurality of patches of candidate colors, which are obtained by correcting the color to be corrected with respective plurality of candidate correction values, in contrast with a color to be printed by respective one or plurality of nozzles which are other than the respective one or plurality of nozzles corresponding to the obtained nozzle position information and eject different colors of inks to a common area of the printing medium; an input unit configured to receive an input of specifying one or plurality of patches from the plurality of patches of candidate colors; and a generating unit configured to generate the parameter used for correcting the image data of pixel area corresponding to the obtained nozzle position information, based on the candidate correction value corresponding to the specified patch, wherein the patch printing control unit causes the printing unit to print the patches of candidate colors the number of which corresponds to the obtained nozzle position.

In a fourth aspect of the present invention, there is provided an image processing method of generating parameters used for correcting image data when generating print data used for printing which a printing unit performs by using a printing head provided with a plurality of nozzle arrays that eject different colors of inks based on the image data, the method comprising: an obtaining step of obtaining color information to be corrected and nozzle position information corresponding to respective one or plurality of nozzles in each of a plurality of nozzle arrays, the respective one or plurality of nozzles ejecting different colors of inks to a common area of a printing medium to create the color to be corrected; a patch printing control step of generating a plurality of candidate correction values for correcting the color to be corrected, based on the color information and the nozzle position information obtained by the obtaining step, and cause the printing unit to print a plurality of patches of candidate colors, which are obtained by correcting the color to be corrected with respective plurality of candidate correction values, in contrast with a color to be printed by respective one or plurality of nozzles which are other than the respective one or plurality of nozzles corresponding to the obtained nozzle position information and eject different colors of inks to a common area of the printing medium; an input step of receiving an input of specifying one or plurality of patches from the plurality of patches of candidate colors; and a generating step of generating the parameter used for correcting the image data of pixel area corresponding to the obtained nozzle position information, based on the candidate correction value corresponding to the specified patch, wherein the patch printing control step causes the printing unit to print the patches of candidate colors the number of which corresponds to the obtained nozzle position.

With the structure described above, a color difference due to printing characteristic variations among a plurality of nozzles can be reduced when an image is printed with a plurality of colors of inks.

Further features of the present invention will become apparent from the following description of exemplary embodiments (with reference to the attached drawings).

BRIEF DESCRIPTION OF THE DRAWINGS

FIG. 24 is an example illustrating the number of times of use for each nozzle position according to the second embodiment.

DESCRIPTION OF THE EMBODIMENTS

In the following, embodiments of the present invention will be explained in detail with reference to the drawings.

Figure 1:
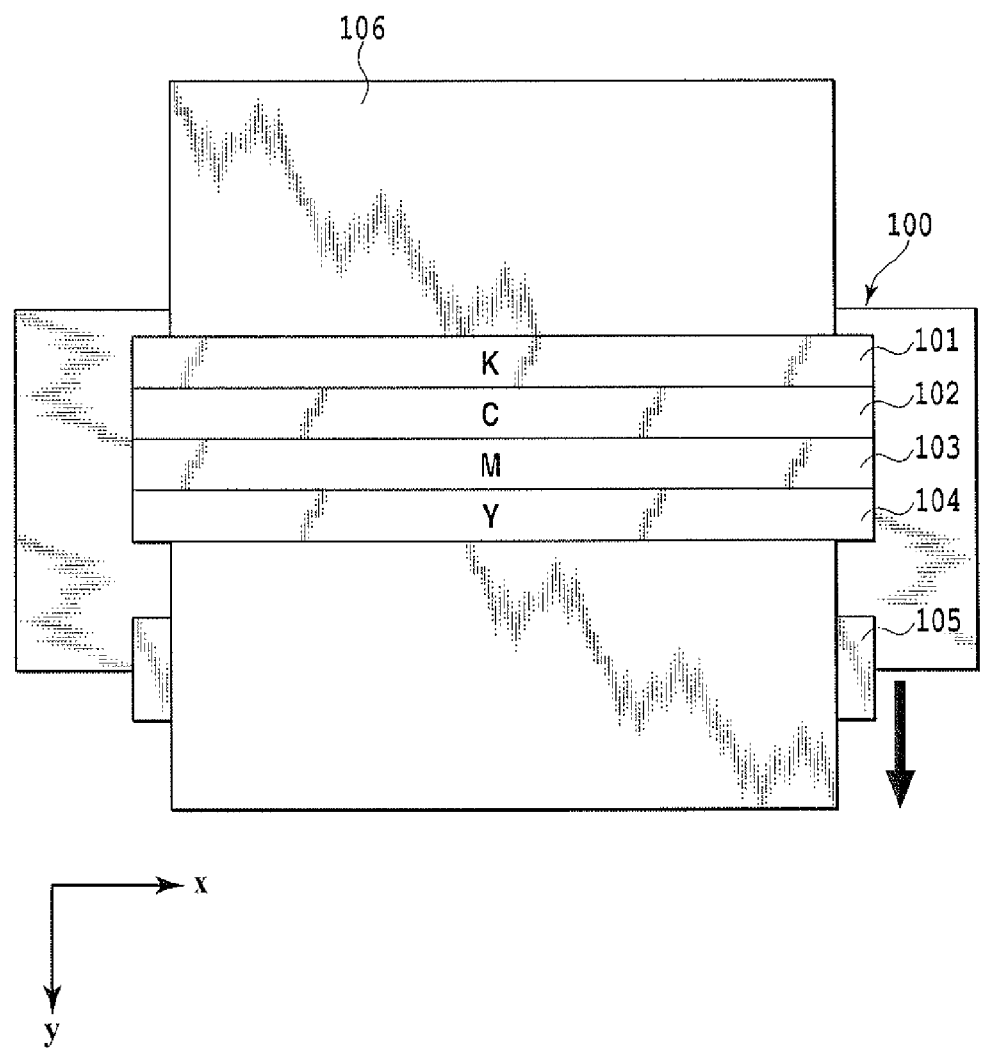
FIG. 1 is a schematic view of an inkjet printer according to one embodiment of the present invention.

FIG. 1 is a schematic view of an inkjet printer (an inkjet printing apparatus) according to one embodiment of the present invention. As illustrated in FIG. 1, a printer 100 has printing heads 101 to 104 on a frame that is a structural material of the printer. Each of the printing heads 101 to 109 is a full-line type printing head, that is, has a plurality of nozzles for ejecting black (K), cyan (C), magenta (M) and yellow (Y) inks respectively, the nozzles being arranged along the X direction over the width of the printing paper 106. A nozzle arrangement of nozzle array of each ink color has a resolution of 1200 dpi.

Figure 10:
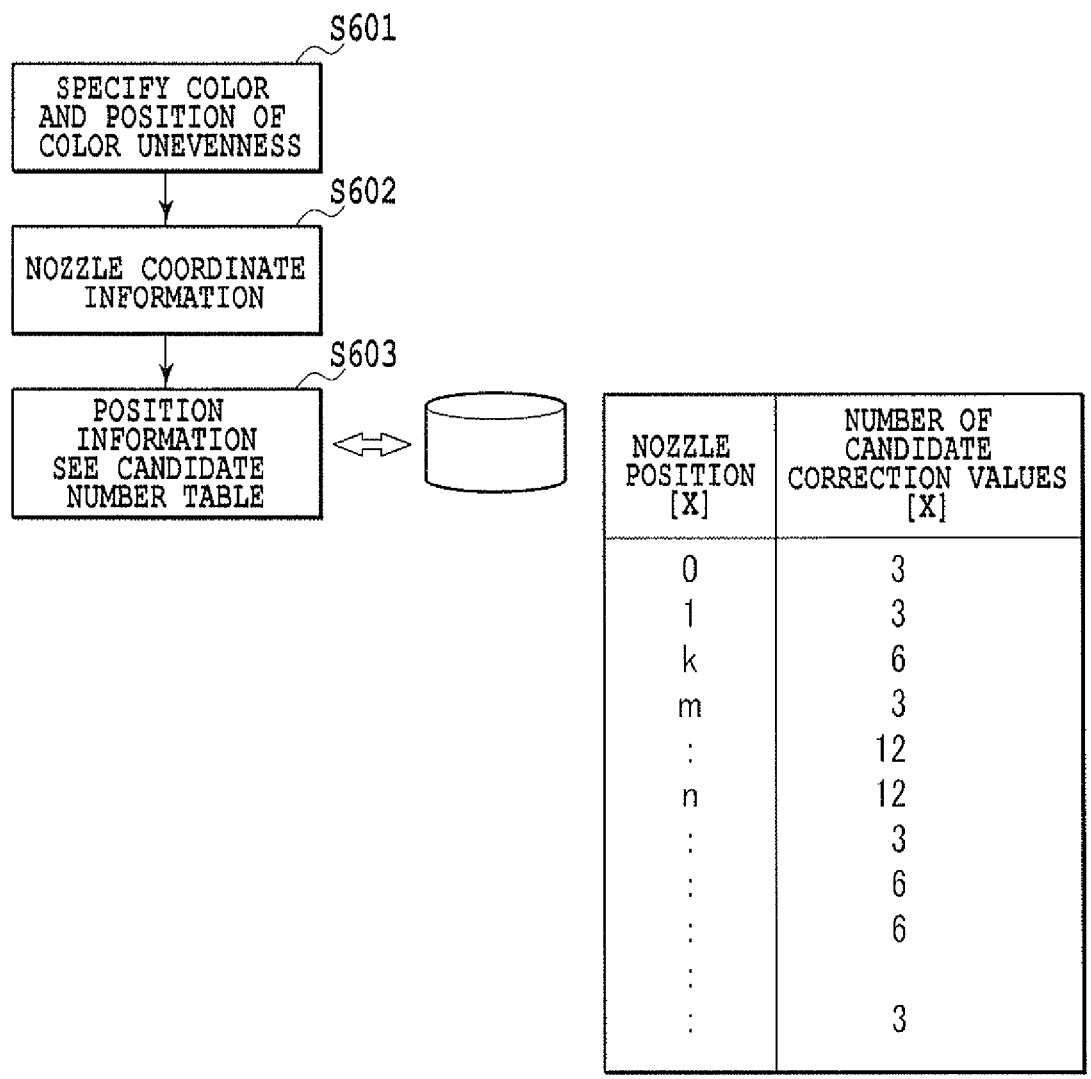
FIG. 10 is a flowchart illustrating processing to determine a number of candidate correction values, m[X], based on nozzle position information X in a nozzle array.

The printing paper 106 as a printing medium is conveyed in the y-arrow direction in FIG. 10 by a conveying roller 105 (and other not shown rollers) rotated by a driving force of a motor (not shown). While the printing paper 106 is conveyed, ink is ejected from the plurality of nozzles of each of the printing heads 101 to 104, according to print data. By this, one raster image corresponding to the nozzle array of each of the printing heads is sequentially printed. In this way, each of the printing heads repeats such an ink ejection operation to a printing paper that is being conveyed, thereby printing, for example, one page of image. A printing apparatus to which the present invention can be applied is not limited to the full-line type apparatus as described above. It will be apparent from the following description that the present invention can be applied to a serial type printing apparatus in which printing is performed by scanning a printing head in a direction that crosses the conveying direction of a printing paper, for example.

Figure 2:
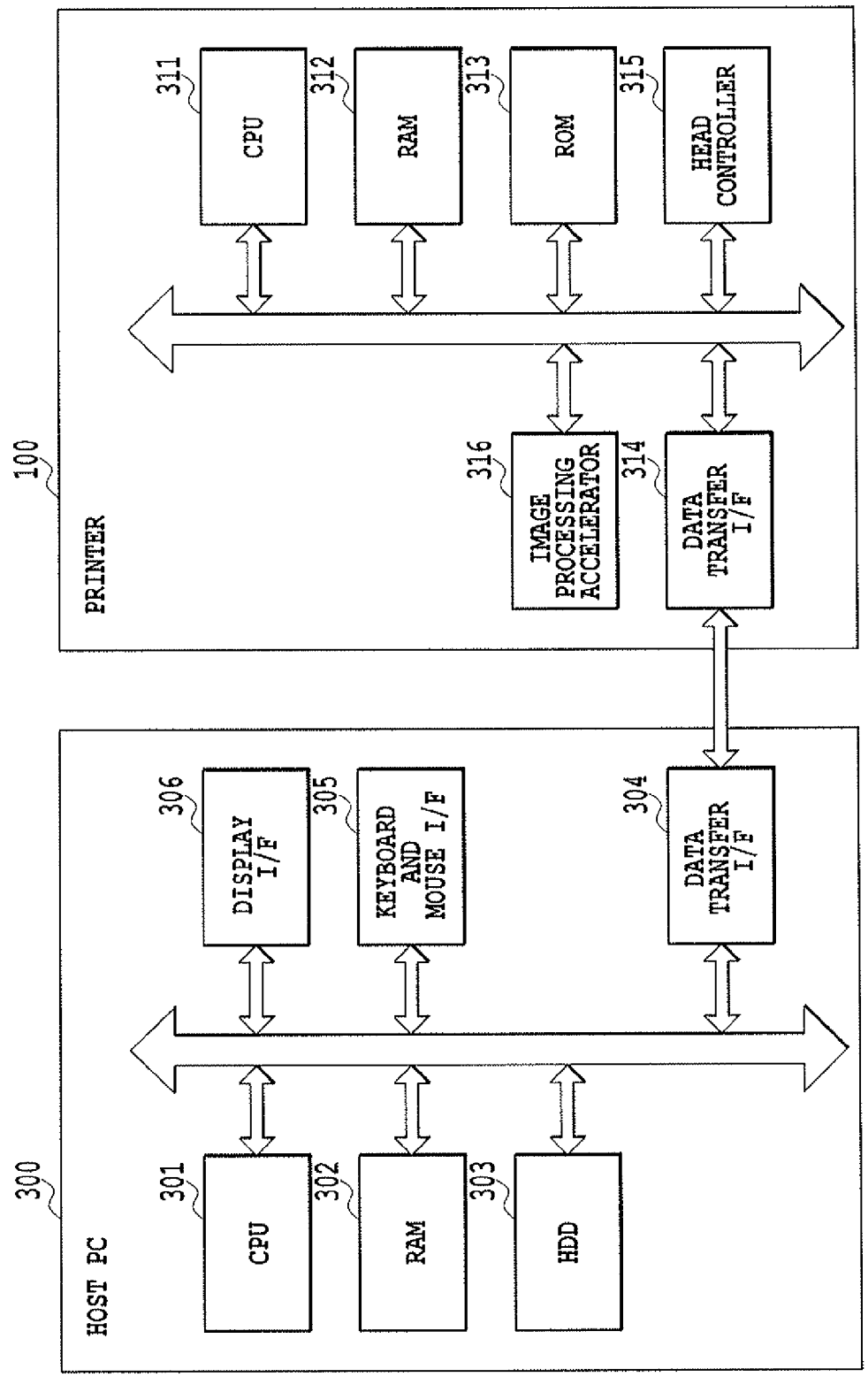
FIG. 2 is a block diagram illustrating a configuration of a printing system according to one embodiment of the present invention.

FIG. 2 is a block diagram illustrating a configuration of a printing system according to one embodiment of the present invention. As illustrated in FIG. 2, this printing system has the printer 100 illustrated in FIG. 1 and a personal computer (PC) 300 as a host device of the printer 100.

The host PC 300 mainly has the following elements. A CPU 301 performs processing according to programs stored in a HDD 303 and a RAM 302. The RAM 302 is a volatile storage and temporally stores programs and data. The HDD 303 is a nonvolatile storage and stores programs and data. A data transfer interface (I/F) 304 controls sending and receiving data to and from the printer 100. As a connection for sending and receiving data, USB, IEEE1394, LAN, etc. can be used. A keyboard and mouse I/F 305 is an interface to control a human interface device (HID) such as a keyboard and a mouse, and a user can input via this I/F device. A display I/F 306 controls display on a display (not shown).

The printer 100 mainly has the following elements. A CPU 311 performs processing of respective embodiments that will be described with reference to FIGS. 4A to 4D and later FIGS., according to programs stored in a ROM 313 and a RAM 312. The RAM 312 is a volatile storage and temporally stores programs and data. The ROM 313 is nonvolatile storage and can store table data, which are generated by processing of respective embodiments that will be described with reference to FIGS. 4A to 4D and later FIGS, and programs.

A data transfer I/F 314 controls sending and receiving to and from the PC 300. A head controller 315 supplies print data to the printing heads 101 to 104 illustrated in FIG. 1 and controls an ejection operation of the printing heads. Specifically, the head controller 315 can be configured to read control parameters and print data from a predetermined address in the RAM 312. When the CPU 311 writes control parameters and print data to the predetermined address in the RAM 312, the head controller 315 initiates processing and ink is ejected from the printing heads. An image processing accelerator 316 is composed of a hardware and performs image processing faster than the CPU 311. Specifically, the image processing accelerator 316 can be configured to read parameters and data required for image processing from a predetermined address in the RAM 312. When the CPU 311 writes parameters and data to the predetermined address in the RAM 312, the image processing accelerator 316 is started to perform predetermined image processing. According to the present embodiment, a software in the CPU 311 performs processing for generating parameters of a table to be used in the MCS processing section, which will be described with reference to FIG. 4A and later FIGS. Image processing that includes processing in the MCS processing section in printing is performed by hardware processing of the image processing accelerator 316. It should be appreciated that the image processing accelerator 316 is not necessarily an essential element, but processing to generate the aforementioned table parameters and image processing can be performed by only processing of the CPU 311 depending on the specification of a printer.

Several embodiments to reduce a color difference due to ejection volume variations among a plurality of nozzles in the case where an image is printed with a plurality types of inks in the aforementioned printing system, will be described below. In a conventional head shading technique in which data of a plurality of different types of inks is individually corrected, if a certain color is represented by overlapping a plurality of different types of inks, the represented color may be different from the color that should be represented, that is, a color difference may occur.

Figure 3A:
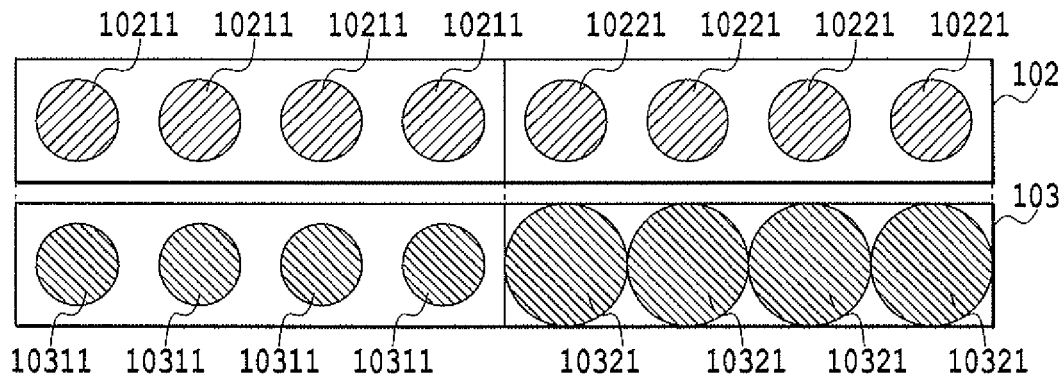
FIGS. 3A to 3C are diagrams illustrating occurrence of a color difference when a certain color is represented by overlapping a plurality of different types of inks.
Figure 3B:
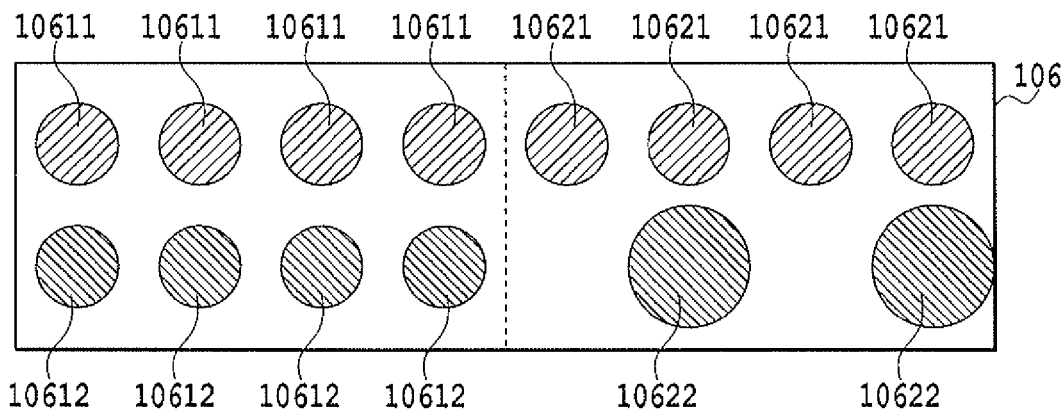
Figure 3C:
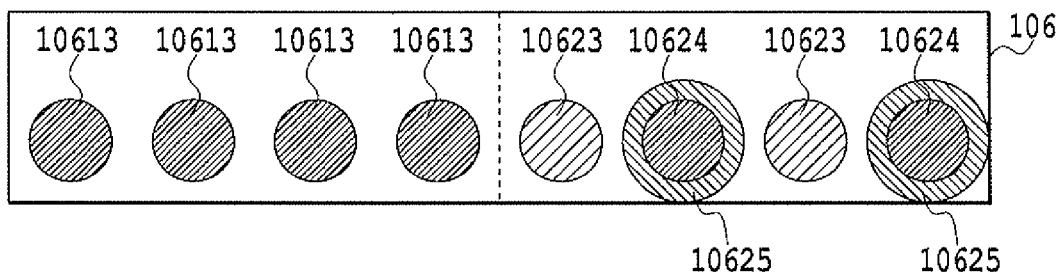

FIGS. 3A to 3C are diagrams illustrating occurrence of the color difference. In FIG. 3A, reference numeral 102 denotes a printing head ejecting cyan ink and reference numeral 103 denotes a printing head ejecting magenta ink. In FIG. 3A, eight nozzles among a plurality of nozzles of each of the printing heads are illustrated in order to make explanation and illustration simple, and by way of example only two printing heads are illustrated to describe a color difference that occurs when blue color is printed with cyan and magenta inks.

The eight nozzles 10211 and 10221 of the cyan ink printing head 102 all have a standard ejection volume. Meanwhile, among eight nozzles of the magenta ink printing head 103, four nozzles 10311 on the left in FIG. 3A have a standard ejection volume and four nozzles 10321 on the right in FIG. 3A have a larger ejection volume than a standard ejection volume. In FIG. 3A, the four nozzles on the right of the magenta ink printing head 103 are illustrated with a bigger size than of those on the left side. The difference of sizes is for making a difference of ejection volumes easy to be understood, but does not indicate a relation of actual nozzle sizes.

In the case where a printing head having such ejection volume characteristics is used, when image data is corrected using a conventional head shading, binary data (dot data) corresponding to the nozzle can be finally obtained. If these cyan and magenta dot data are printed on the printing paper 106 individually without overlapping on the basis of these data, they are represented by an illustration in FIG. 3B. An example in FIG. 3B illustrates dots printed in such a way that solid images, that is, cyan image data of 100% duty and magenta image data of 100% duty, are subject to head shading processing, and then binarization.

FIG. 3B shows cyan dots 10611 and 10621 corresponding to the nozzles of the cyan ink printing head 102 and magenta dots 10612 and 10622 corresponding to the nozzles of the magenta ink printing head 103. Among them, the number of magenta dots 10622, which corresponds to the four nozzles 10321 with a larger magenta ink ejection volume, is reduced as the result of correcting image data of its corresponding region by head shading. FIG. 3B illustrates an example in which an area of each dot formed by ink ejected from magenta ink nozzles 10321 that has a larger ejection volume is twice as large as that of each dot formed by ink of a standard ejection volume. In this case, correction by head shading reduces the number of dots by half (from four dots to two dots). When the area of each dot doubles, the number of dots reduces by half, in order to make explanation simple. It should be appreciated that practically the number of dot data is determined so that increase (decrease) of density due to increase (decrease) of a dot area caused by ejection volume variations can be suppressed to a standard density.

FIG. 3C illustrates an example in which cyan and magenta inks are ejected from the respective printing heads to print a blue image on the printing paper 106 on the basis of dot data obtained as described above. In FIG. 3C, standard-sized blue dots 10613 are formed by overlapping cyan and magenta inks and printed on the region on the printing paper 106 that is illustrated on the left in FIG. 3C, whereas standard-sized cyan dots 10623 as well as dots, each of which is composed of a blue area 10624 formed by overlapping cyan and magenta inks and a magenta area 10625 surrounding the blue area 10624, are printed on the region of the right in FIG. 3C corresponding to four nozzles 10321 having a larger magenta ink ejection volume.

In this way, a region for printing (a solid image of) blue on the right in FIG. 3C corresponding to the magenta nozzles 10321 having a larger ejection volume is composed of the following three types of dots or areas.

Two standard-sized cyan areas (dots) 10623

Two blue areas 10624, each being formed by a standard-sized cyan dot within a magenta dot having a larger size than a standard size Two magenta areas 10625, each surrounding a standard-sized blue area 10624

As described above, in the conventional head shading, cyan and magenta image data is individually corrected to adjust the number of the respective dots. As a result, the relation will be that an area of two cyan areas (dots) 10623=an area of two blue areas 10624=an area of two magenta areas 10625. In this case, if a color that can be observed on the whole due to light absorption characteristics of the cyan areas 10623 and light absorption characteristics of the magenta areas 10625 are identical to a color that can be observed due to light absorption characteristics of the blue areas 10624, the entire region has the same color as that of the blue areas 10624.

However, in the case where an area, such as the blue areas 10624, is formed by overlapping a plurality of different types of inks, a color that is observed due to light absorption characteristics of the area is often different from a color that is observed on the whole due to combining of the light absorption characteristics of the respective areas of the plurality of inks. As a result, the entire region has a color difference from a targeted standard color, and on the printing paper 106 a blue image on the left half region in FIG. 3C and a blue image on the right half region in FIG. 3C appear to have different colors.

When correcting the above color difference, it is considered to print a patch by overlapping a plurality of inks such as a patch by a secondary color of cyan and magenta inks. Then, it is considered to measure the color or density of this patch by a device such as a colorimeter or a scanner and to generate correction data to correct the color difference based on the measurement data.

However, for example, when color unevenness is measured by the colorimeter, a colorimetric measurement error may occur. For example, a spectrophotometric colorimeter performs colorimetry by reading a reflected light within a certain spot diameter. However, if a range of color unevenness is smaller than a range of the spot diameter, the colorimeter reads a region of the color unevenness and also the surrounding thereof, resulting in inaccurate measurement of the color unevenness. With the use of an image input device such as a scanner, an accuracy of a human eye may not be reproduced, in such a case where metamerism occurs depending on an accuracy of a sensor and a case where a color difference cannot be identified depending on bit counts for generating an input image.

Therefore, according to the present invention, a plurality of patches or patterns having different color unevenness correction values are printed as candidates; and the color and position of a portion that has the most uneven color are detected from the plurality of patches or patterns by human eyes and specified through an interface, and thereby a correction value is determined. In the determination of the correction value, the color unevenness correction is performed effectively in a short time and with a low cost.

More specifically, how color unevenness occurs may vary depending on positions of nozzles of a nozzle array of a printing head. For example, when a printing head is composed of a plurality of chips, a degree of occurrence of color unevenness may be different between an overlapping portion of chips and portions other than the overlapping portion. In this case, if the number of patches as candidates is set to be uniform regardless of the nozzle positions, there occurs a problem that processing to correct the color unevenness requires much time and cost as well as reducing correction accuracy. Specifically, if the number of patches as candidates is set to be relatively large and printed on the assumption that a degree of color unevenness to occur is large, the number of printed patches increases. As a result, in the correction for a nozzle position where a degree of color unevenness that has occurred is originally small, unnecessary patches are printed, causing unnecessary processing time and cost. The present invention determines the number of patches according nozzle positions in a nozzle array of a printing head in order to solve such a problem.

It should be noted that the description of the color difference is made for the case of binary printing example in which a dot is printed or is not printed, but may be made for other printing example. For example, even in a multi-valued printing apparatus in which a size of a dot can be variable, such as a four-valued printing apparatus to perform printing with three-sized dots, that is, large, medium and small dots, there may be dot size variations due to ejection volume variations among nozzles. In this case, even by performing correction by the conventional head shading, a color difference may occur due to the same reason as above. Accordingly, the present invention can be applied to not only a binary printing apparatus but also a three-valued or more-valued printing apparatus.

Embodiments of the present invention that will be described below reduce the aforementioned color difference by correction processing on image data composed of a plurality of color signal sets prior to being subject to quantization.

First Embodiment

Figure 4A:
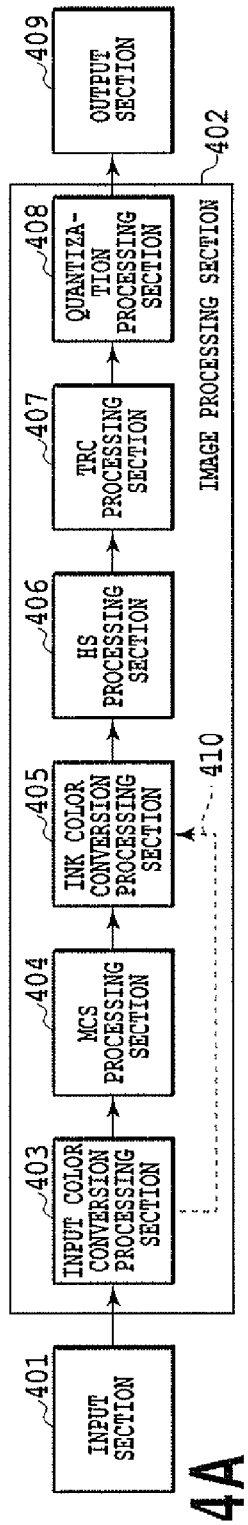
FIGS. 4A to 4D are block diagrams, each illustrating a configuration of an image processing section of an inkjet printer according to a first embodiment of the present invention or variations thereof.

FIG. 4A is a block diagram illustrating a configuration of an image processing section in an inkjet printer according to a first embodiment of the present invention. More specifically, in the present embodiment, the image processing section is composed of the respective elements for control and processing of the printer 100 illustrated in FIG. 2. It should be appreciated that application of the present invention is not limited to this embodiment. For example, the image processing section may be configured in the PC 300 illustrated in FIG. 2, or part of the image processing section may be configured in the PC 300 and other parts thereof may be configured in the printer 100.

As illustrated in FIG. 4A, an input section 401 receives input image data transmitted from the host PC 300 and passes the image data to an image processing section 402. The image processing section 402 includes an input color conversion processing section 403, a multi color shading (MCS) processing section 404, an ink color conversion processing section 405, a head shading (HS) processing section 906, a tone reproduction curve (TRC) processing section 407, and a quantization processing section 408.

In the image processing section 402, first, the input color conversion processing section 403 converts image data inputted by the input section 401 to image data corresponding to a color reproduction range of the printer. In the present embodiment, inputted image data is data indicative of color coordinates (R, G, B) in an color space coordinate, such as sRGB that is expression colors of a monitor. The input color conversion processing section 403 converts this 8-bit input image data R, G, B to image data (R', G', B') of a color reproduction range of a printer that is a color signal composed of three elements by a known method such as matrix operation processing or processing using a three-dimensional lookup table. In the present embodiment, the conversion processing is performed by using a three-dimensional lookup table together with interpolation operation. The 8-bit image data dealt with in the image processing section 402 has a resolution of 600 dpi. Binary data obtained by quantization in the quantization processing section 408 has a resolution of 1200 dpi, as will be described later.

The multi color shading (MCS) processing section 404 performs correction processing on the image data converted by the input color conversion processing section 403. This processing is performed using a three-dimensional lookup table, as will be described later. This correction processing can reduce the above described color difference even due to ejection volume variations even if there is the ejection volume variations among the nozzles of the printing head in an output section 409. The concrete content of the table for this MCS processing section 404 and correction processing using the table will be described later.

The ink color conversion processing section 405 converts the 8-bit image data of each of R, G, B processed by the MCS processing section 404 to image data composed of color signal data of inks used in a printer. Since the printer 100 according to the present embodiment uses black (K), cyan, (C), magenta (M) and yellow (Y) inks, image data of RGB signals is converted to image data composed of 8-bit color signals of each of K, C, M and Y. This color conversion is performed using a three-dimensional lookup table and interpolation operation, as the aforementioned input color conversion processing section. As another conversion method, matrix operation processing may be used as the above.

The head shading (HS) processing section 406 receives the input image data of ink color signals and converts the 8-bit data of each ink color to the image data of ink color signals corresponding to an ejection volume of each nozzle composing the printing head. That is, this processing is the same as the aforementioned conventional head shading processing. In the present embodiment, this HS processing is performed using a one-dimensional lookup table. In applying the present invention, this HS processing section does not need to be provided, unless otherwise noted. That is, there are cases where the accuracy of correction processing by the MCS processing section is sufficient relative to memory capacity, depending on the specification of a printer. In such cases, processing by the HS processing section can be included in the correction processing by the MCS processing section.

The tone reproduction curve (TRC) processing section 407 performs correction to adjust the number of dots to be printed by the output section 409 for each ink color on the image data composed of the respective 8-bit ink color signals that has been subjected to HS processing. More specifically, there are cases where a relation between the number of dots to be printed on a printing medium and a lightness realized by the number of dots is not linear. The TRC processing section 407 corrects image data composed of the respective 8-bits so as to make this relation linear, adjusting the number of dots to be printed on the printing medium.

The quantization processing section 408 performs quantization processing on the image data composed of the respective 8-bit (256 values) ink color signals processed in the TRC processing section 407 to obtain one-bit binary data. In this processing, according to the present embodiment, the 8-bit data is first converted to 3-bit, 5-valued index data ("0" to "4") for each color. This index data "0" to "4" corresponds to a pattern in which zero to four dots are arranged in 2×2 pixels at a resolution of 1200 dpi. It should be appreciated that a mode of quantization 408 is not limited to this mode in applying the present invention. For example, 8-bit image data may be directly binarized to obtain binary data (dot data). As a method for quantization processing, the present embodiment uses an error diffusion method, but other pseudo halftone processing such as a dithering method may be used.

The output section 409 drives the printing head to eject each color ink on the printing medium on the basis of the dot data obtained by quantization to perform printing. Specifically, the output section 409 includes a printing mechanism having the printing heads 101 to 104 illustrated in FIG. 1.

Figure 5:
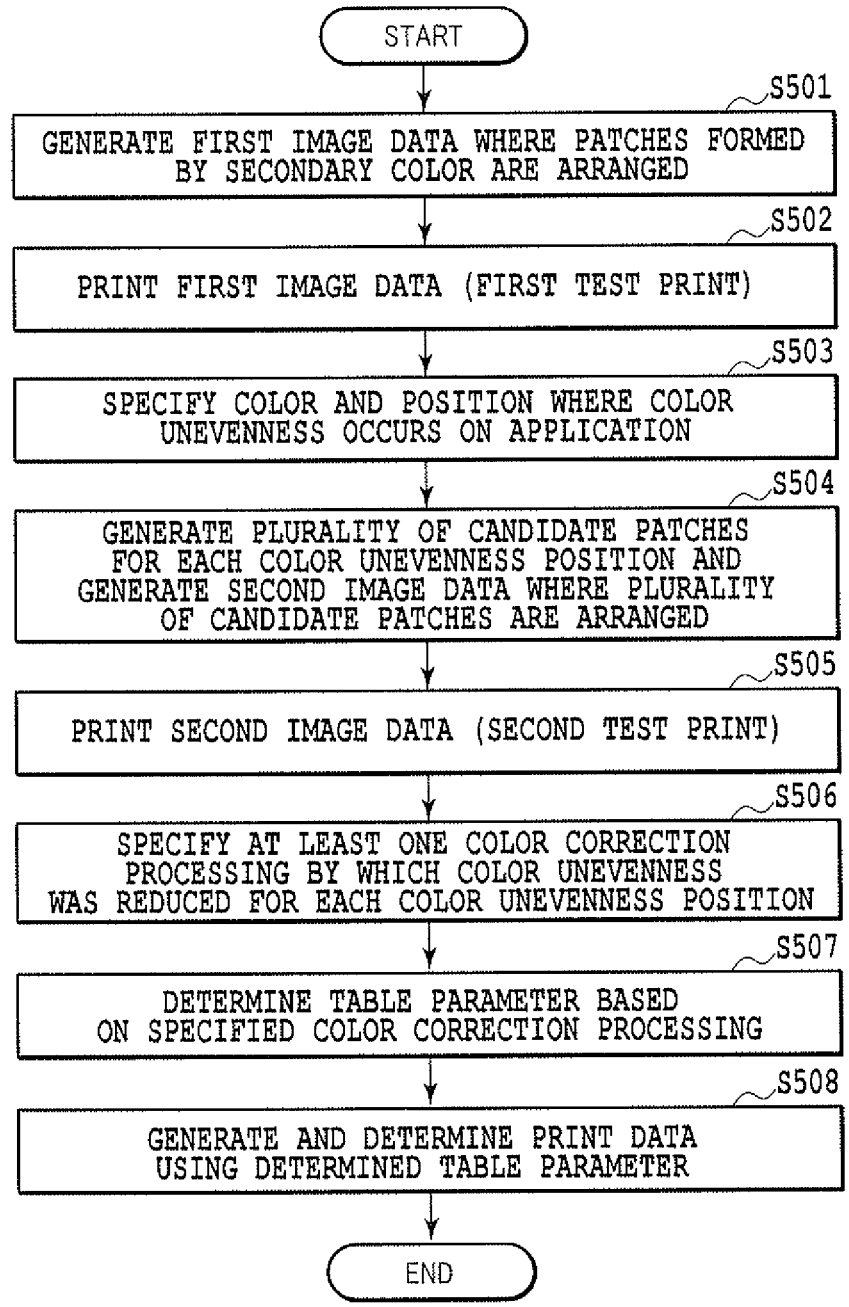
FIG. 5 is a flow chart, illustrating processing for generating parameters of a table to be used by an MCS processing section 404 illustrated in FIG. 4A and processing by the MCS processing section 404 using the table in image processing to generate print data, respectively.

FIG. 5 is flow chart illustrating processing for generating parameters of a table to be used by an MCS processing section 404 illustrated in FIG. 4A and processing by the MCS processing section 404 using the table in image processing for generating print data, respectively.

In FIG. 5, processing S501 to S507 generate parameters of a three-dimensional lookup table to be used by the MCS processing section 404. En the present embodiment, the processing of generating the table parameters is performed when a printer is manufactured, has been used for a predetermined period, or has performed a predetermined amount of printing. That is, the processing of generating table parameters also may be performed as calibration, which updates table parameters that are the content of the lookup table. A step S508 is of a processing for generating printing data by the image processing section 402 and performing printing based on the generated printing data, which include processing of the MCS processing section 404 with use of the table generated by the above processing. It should be appreciated that timing for performing generation processing of table parameters is not limited to the aforementioned timing in applying the present invention. For example, the generation processing may be performed just before processing S508 for printing are performed.

In processing to generate table parameters in steps S501 to S507, a plurality of patches are printed in such a way that each of the patches whose color signal representing one secondary color is corrected with a different candidate of a correction value (a different candidate correction value). Then, from among the printed patches, a candidate correction value of a patch whose color unevenness is the least visible is determined to be a correction value, and a value obtained by correcting the above color signal by the determined correction value is set to be a table parameter. In this determination of table parameter, a user specifies a position of color unevenness in the nozzle array and selects the patch whose color unevenness is the least visible. Furthermore, in the present embodiment, the number of patches for each above candidate correction value varies depending on a nozzle position where color unevenness occurs.

First, in the present embodiment, after table parameters for the HS processing section 406 are generated, table parameters for the MCS processing section are generated. Therefore, at the time point of step S501 on which this processing is started, table parameters for the HS processing section have been already generated (updated). For example, if there are ejection volume variations among the nozzles of the magenta ink printing head 103 as illustrated in FIG. 3A, table parameters for the HS processing section are generated so that the number of dots in a region corresponding to four nozzles 10321 on the right half are half the number of dots in a region corresponding to four nozzles 10311 on the left half, as illustrated in FIG. 3B. If each nozzle of the cyan ink printing head 102 has ejection volume characteristics illustrated in FIG. 3A, that is, if all the nozzles have a standard ejection volume, table parameters for the HS processing section are parameters so as to convert image data as what it is. In this way, according to the present embodiment, when table parameters for the MCS processing section are generated or updated, the table parameters for the HS processing section are generated prior to this. This can properly reduce a color difference due to the variations among nozzles by total processing of the MCS processing section and HS processing section.

Further, in the present embodiment, as described above, the MCS processing section 404 is described as a system to input and output an RGB signal value. Meanwhile, in processing to obtain table parameters, as will be described later, processing to deal with a color to be printed on a printing medium exists. In this processing, it is preferable that there is a parameter that permits reproducing a color of a standard ejection volume on a printing medium for each printing medium, such as an LUT converting an RGB signal value to L*a*b* value or a CMYK value. Alternatively, a conversion equation to convert an RGB signal value to L*a*b* value on a printing medium may be stored. This allows estimating a conversion value of an input value in order to represent a desired color on a printing medium in the present embodiment. Especially, in processing of step S504, which will be described later, color conversion processing can be performed using the color on a printing medium as a reference. Therefore, it is preferable that a printer profile for each printing medium or an LUT to be used in the ink color conversion processing section 405 is stored in the MCS processing section 404, prior to the processing illustrated in FIG. 5.

Then, the host PC 300 specified a printing medium to be used in generating table parameters for MCS processing, prior to the processing illustrated in FIG. 5. Then, according to the specified printing medium, a printer profile of each printing medium or an LUT to be used in the ink color conversion processing section 405 is copied from the ROM 313 of the printer 100 and stored in the RAM 302 of the host PC 300. With respect to specifying the printing medium, a user may manually select the printing medium from a previously prepared list of printing mediums or the pr inter 100 may automatically detect the printing medium and transfer the result to the host PC 300.

In processing illustrated in FIG. 5, first, in step S501, first image data to be used in printing patches to specify a nozzle position where color unevenness occurs are generated. That is, image data are generated in which patches of a plurality of colors including at least a secondary color are laid out by color patches printed by nozzle arrays of printing heads 101 to 109 illustrated in FIG. 1. En generating the data, if for example, 16,770,000 color patches of 256 gradations for each of the R, G, B are generated, an enormous cost would be required. Therefore, for example, patches are printed for 17×17×17 combinations (lattice points) by dividing signal values 0 to 255 in 17 for each of R, G, B. Alternatively, if a nozzle that is likely to cause color unevenness is previously known, only patches of the color printed by a combination of nozzles including that nozzle may be printed. That is, among the lattice points, lattice points where color unevenness tends to significantly change depending on nozzle ejection characteristics may be selected and patches may be printed only for combination of R, G, B corresponding to these lattice points. The lattice points specified as described above include (R, G, B)=(0, 0, 255) corresponding to a blue image having the color unevenness illustrated in FIGS. 3A, 3B and 3C. Image data of patches include data so as to print, in the vicinity of a region where a patch is printed, an identifier indicating a position of a nozzle that printed the patch. As this identifier, a known identifier such as a number and a scale can be used.

Instead of RGB lattice points, the above printer profile or the LUT used in the ink color conversion processing section 405 may be used to generate an image in such a way that patches are arranged at regular intervals in a uniform color space.

Next, in step S502, the first image data generated in step S501 is printed, which will be hereinafter referred to as a first test print.

Figure 6A:
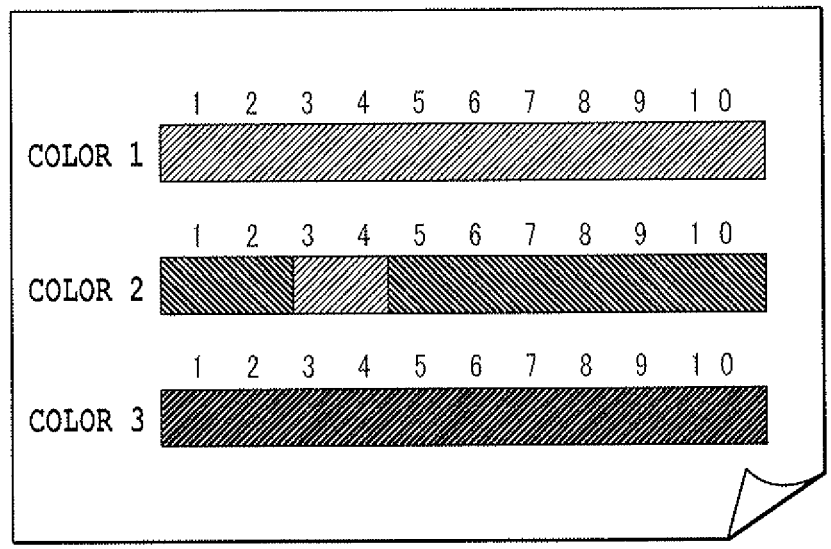
FIG. 6A is a diagram illustrating an example of patches printed in a first test print of step S502 shown in FIG. 5.

FIG. 6A illustrates an example of patches printed in this first test print. In this first test print, selected several sets of image data (R, G, B) for printing patches are inputted to the ink color conversion processing section 405 as image data that has been subjected to processing by the input color conversion processing section 403 (hereinafter referred to as device color image data D[X]), without being subjected to processing by the MOB processing section 404. This path is illustrated as a bypass path by a dashed line 410 in FIG. 4A. In processing by the bypass path, for example, a table having a relation of an input value equal to an output value may be prepared, and device color image data D[X] may be inputted to the MCS processing section 404 and the input value may be outputted without being changed, regardless of a value of X. After that, the image data is subjected to the same data processing as data processing at normal printing in the HS processing section 406, TRC processing section 407 and quantization processing section 408, and then in the output section 409 patches are printed on the printing paper 106 in an arrangement illustrated in FIG. 6A.

If table parameters to be used in the MCS processing section 404 have been already generated prior to performing processing illustrated in FIG. 5, the image data generated in step S501 is subjected to processing by the MCS processing section 404 and inputted to the ink color conversion processing section 405. Here the table parameters used in the MCS processing section 404 have been generated or updated prior to the present processing. In this way, when table parameters already exist and are to be updated, processing may be performed in the MCS processing section 404 without going thorough the bypass path 910 illustrated in FIG. 4A.

In the above processing process, image data of patches represented by (R, G, B) is converted to image data (C, M, Y, K) represented by ink color signals in the ink color conversion processing section 405. In this processing, when the image data of patches generated in step S501 include (R, G, B)=(0, 0, 255), this data is converted to data whose signal value is (K, C, M, Y) (0, 255, 255, 0), that is, data in which 100% cyan and 100% magenta are printed. After that, processing by the HS processing section 406 and later processing convert the image data of (K, C, M, Y)=(0, 255, 255, 0) to dot data illustrated in FIG. 3B according to nozzle positions, which are printed as illustrated in FIG. 3C. In the following description, in order to simplify description, generation processing of table parameters will be described only for a case where a blue image has color unevenness and table parameters corresponding to lattice points representing these image data of blue patches are generated.

In device color image data D[X], X is a value to specify pixels with a resolution of 600 dpi in an image data for measurement. In other words, X is a value for specifying, as a section of 300 dpi, a pixel area (hereinafter simply referred to as an area) corresponding to contiguous four nozzles in a nozzle arrangement of each ink color printing head illustrated in FIG. 1. Accordingly, since a resolution of dots printed corresponds to the resolution of the nozzle arrangement and is 1200 dpi, two pixels of the image data D [X] having a 600 dpi resolution corresponds to one of the aforementioned area and is specified as X. As described above, this device color image data D[X] is subject to processing of the ink color conversion processing section 405 and later processing, and the image for measurement of the data is printed in the output section 409.

Figure 7A:
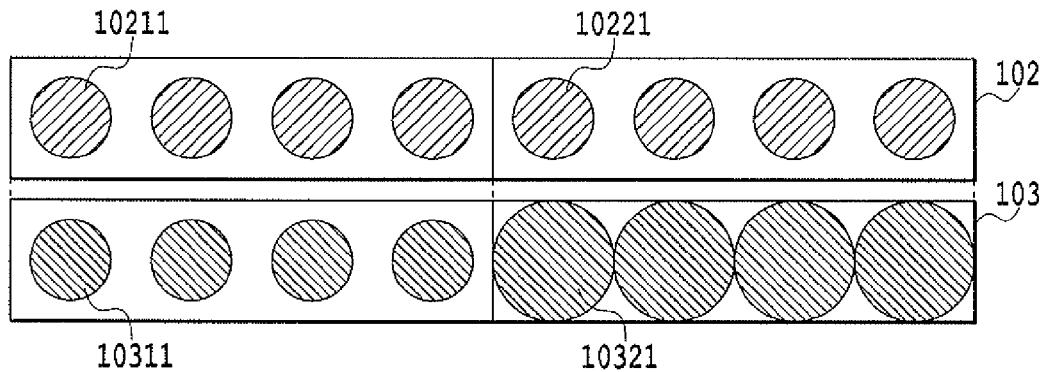
FIGS. 7A and 7B are diagrams illustrating printing examples of patches by the first test print of step S502 shown in FIG. 5.
Figure 7B:
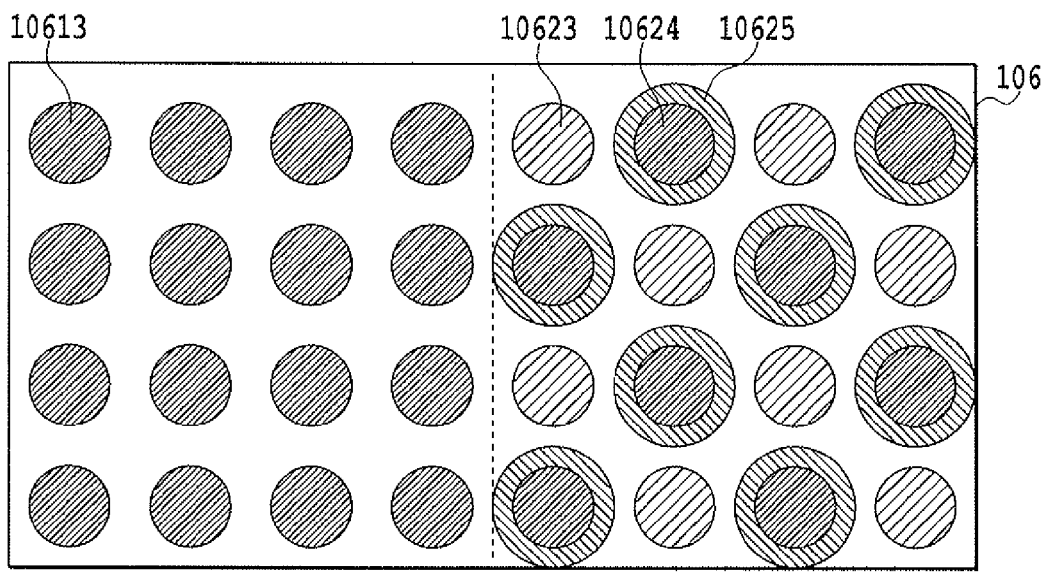

FIGS. 7A and 7B are diagrams illustrating printing of the patches shown in FIG. 6A. In FIGS. 7A and 7B, elements identical to those illustrated in FIGS. 3A to 3C have the same reference numerals and are not described here.

FIG. 7A, similarly to the example illustrated in FIG. 3A, illustrates an example in which four nozzles on the right in FIG. 7A among nozzles of the magenta printing head 103 have a larger ejection volume than a standard ejection volume. In this case, the path of a blue illustrated in FIG. 7B is printed as a result of being subjected to the HS processing. That is, the path is printed in which a region on the right in FIG. 7B has a color difference and the blue of the region is different from the blue on the left region in FIG. 7B.

In FIG. 5, in the next step S503, a color and a position corresponding to a nozzle where color unevenness occurs, which is specified by a user's visually checking the patch printed in step S502, are inputted. That is, the user visually checks a printing state of patches illustrated in FIG. 6A, thereby detecting in which color and at which nozzle position color unevenness occurs in the first test print. For example, in FIG. 6A, the user detects that color unevenness occurs at "nozzle positions 3 to 4" of "color 2". Then, the user specifies the color and nozzle positions of the color unevenness in the first test print, for example, through an interface displayed on a display (not shown) in the printer 100.

Figure 6B:
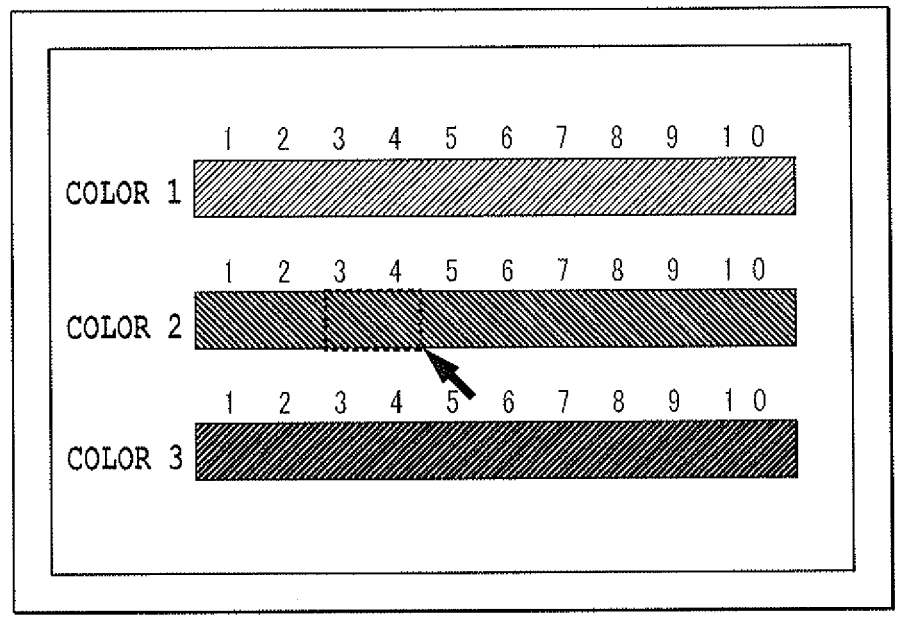
FIG. 6B is a diagram illustrating a user interface used in step S502 shown in FIG. 5.

FIG. 6B illustrates a user interface of an application that performs the present processing. If it is detected that color unevenness occurs at "nozzle positions 3 to 4" of "color 2" in the first test print illustrated in FIG. 6A, a position corresponding to the detected color unevenness is specified on the interface illustrated in FIG. 6B. For example, both end positions (nozzle positions 3, 4) of color unevenness are specified with a cursor on a patch of "color 2" represented in FIG. 6B. If the color unevenness has a density gradient, a position where the color unevenness is strongest, that is, the maximum may be selected on the patch on the interface. In this case, color correction in step S504, which will be described later, is performed in such a way that the closer to a position of the maximum value of the color unevenness is, the larger a degree of the correction is and the closer to the both ends of the color unevenness is, the smaller a degree of the correction is. This can change color correction processing according to a nozzle position even if the color unevenness has a density gradient therein. When the color and nozzle position of the color unevenness are specified, colors and nozzle positions may be numbered, and the color and nozzle position may be specified with the numbers, instead of the cursor as illustrated in FIG. 6B.

In FIG. 5, in next step S504, color correction processing is performed on the color and nozzle position specified and inputted in step S503. That is, with respect to the patch of the color specified in step S503, for image data (X) corresponding to the specified nozzle position X, a plurality of patches of image data (X), each having being corrected by each of a plurality of candidate correction values, are generated and laid out to generate second image data. In this processing, as will be described later, the number of generated patches, that is, the number of candidate correction values is determined according to the nozzle position specified in step S303.

Figure 8A:
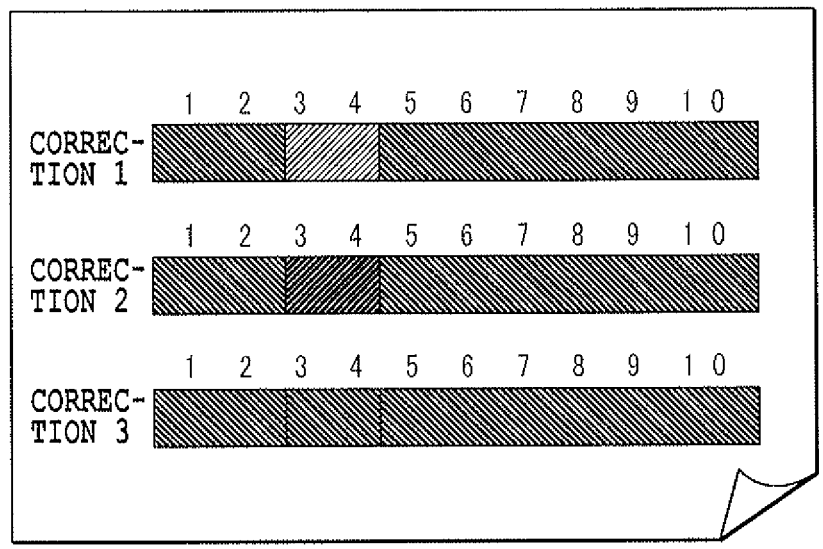
FIG. 8A is a diagram illustrating an example of patches printed in a second test print of step S505 shown in FIG. 5.

FIG. 8A illustrates patches printed on the basis of the second image data in next step 505, which are candidate patches of three candidate correction values for the nozzle position (X=3, 4).

Generation of image data of these candidate patches will be described below.

Suppose that device color image data D[X] of the color specified in step S503 is (R, G, B)=, (0, 0, 255), that is, blue, and positions specified in cyan and magenta nozzle arrays to print this color patch are third and fourth areas (X=3, 4). In this case, device color image data D[X=3] and D[X=4] are subject to the following processing. In other words, among table parameters used in the MCS processing section 404, with respect to a lattice point represented by (R, G, B)=(0, 0, 253), a table parameter is obtained for each of third and fourth areas (X=3, 4). That is, according to the present embodiment, a table (parameters) is provided for each area corresponding to a nozzle position; and in this example, a table parameter is obtained for each of the areas indicated by X=3, 4.

Supposing that an area specified by generalization is X=n, image data corresponding to this area [n] is corrected as follows. With respect to a candidate correction value $Z_i[n]$ composed of a combination of each of R, G, B components, m (i=1 to m) candidate correction values $Z_i[n]$, each having a different combination of R, G, B components, are generated. Then, m corrected image data are obtained by adding each of the m candidate correction values to the image data of the above lattice point, and m patches are printed based on this corrected image data. According to the present embodiment, the corrected image data or the number of candidate correction values, m, is varied depending on a nozzle position, as will be described later.

The above correction processing is represented by an expression below. Color-corrected device color image data Di[X] (a second color signal) is obtained by adding a color correction value Zi[n] to image data D[n] of a specified lattice point according to the expression below. That is, the relation between the first color signal D[X] and second color signal. Di[X] is as follows.

Color-corrected device color image data Di[n] D[n]+Zi[n]

The m patches generated as described above are laid out in parallel in an image to generate the second image data.

An area that is not specified due to no color unevenness is not subject to color correction processing. Accordingly, in processing in the present step, image data D[X] in an area other than the area of X=n do not change.

In the above example, description has been made assuming that color correction is performed as making an RGB value a reference, but, for example, an RGB value may be converted to a value of a uniform color space (L*, a*, b*) and m color-corrected patches at regular intervals may be generated in this uniform color space. That is, the above printer profile and LUT used in the ink color conversion processing section 405 are used to convert the first color signal D[X], second color signal Di[X] and color correction value Zi[n] to an L*a*b* value or CMYK value and processing is performed. In the process, first, an RGB value of the first color signal D[X] is converted to an L*a*b* value in the printer profile. Next, a color correction value Zi[n] represented by an L*a*b* value is added to the converted L*a*b* value to obtain the second color signal Di[X]. Finally, the printer profile is used to perform interpolation processing by inverse operation, and thereby color correction on the basis of the L*a*b* value can be performed.

Next, processing to determine the above m candidate correction values will be described.

According to the present embodiment, a color correction value Zi[n] is determined according to a position of a color space, mainly on the basis of human visual characteristics. That is, in determining m candidate correction values, for example, in the vicinity of gray where a color difference can be identified with a high accuracy by a human visual perception, it is preferable that m candidate correction values Zi[n] are changed in smaller intervals, and thereby the correction values with a high accuracy according to the human visual characteristics can be determined. On the other hand, in a region whose lightness is low or whose saturation is high, identification of color unevenness is less accurate than in the gray region. Therefore, even if m candidate correction values Zi[n] are changed in larger intervals, the correction value can be determined with a high accuracy according to the human visual characteristics. In contrast, if m candidate correction values are set to fixed values regardless of color, there may be a case where human visual characteristics and an interval of change of m candidate correction values Zi[n] do not match each other; as a result, the candidate correction values cannot be determined with a high accuracy. Therefore, according to the present embodiment, when m candidate correction values are determined, each R, G, B component of the candidate correction values is sequentially changed little by little in the ascending order from the smallest value and if the correction value obtained by changing in such a way goes beyond an identification threshold based on the human visual characteristics, the correction value is sot to a candidate correction value.

Figure 9:
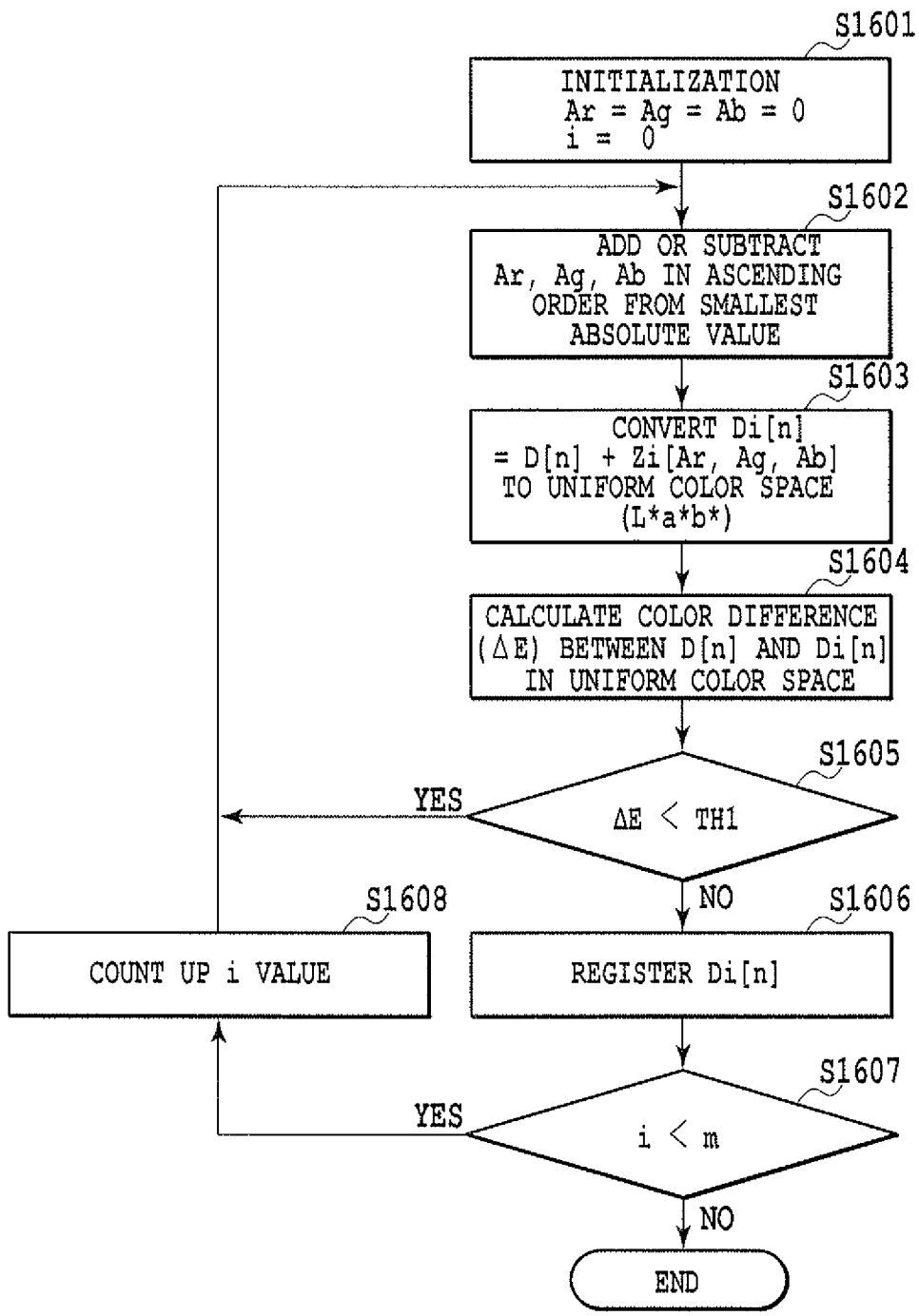
FIG. 9 is a flow chart illustrating a procedure of processing to determine a plurality of candidate correction values according to a first embodiment of the present invention.

FIG. 9 is a flow chart illustrating a procedure of processing to determine candidate correction values or candidate patch data in step S504.

Suppose that R component additional value, G component additional value and B component additional value of a correction value Zi[n] are Ar, Ag and Ab respectively. They are first initialized in step S1601 to be Ar=Ag=Ab=0. Next, in step S1602, the additional values Ar, Ag, Ab are set so that a distance of a correction value Zi[n] from a color D[n] of a lattice point to be corrected is changed from the smallest value, and the set additional values Ar, Ag, Ab are added to the R, G, B components of the color D[n] of the lattice point. Specifically, the number of step of additional values Ar, Ag, Ab to be changed is set to one. That is, the additional values Ar, Ag, Ab are changed to +1, −1, +2, −2, +3, −3 . . . . At this time, a distance from the color D[n] of the lattice point changes in such a way of 1, √2, √3, . . . .

In this case, in step S1602, first, in the case where the distance is 1, a value of (Ar, Ag, Ab)=(1, 0, 0) is added. After that, through processing steps S1603 to S1605, which will be described later, when returning to step S1602, a value of (Ar, Ag, Ab)=(0, 1, 0) is added. After that, in the same manner, when returning to step S1602, each of values of (Ar, Ag, Ab)=(0, 0, 1), (−1, 0, 0), (0, −1, 0), (0, 0, −1) is sequentially added or subtracted. Next, when returning to step S1602, in the case where the distance is √2, whenever returning to step S1602, each of values of (Ar, Ag, Ab)=(1, 1, 0), (0, 1, 1), (1, 0, 1), (−1, 1, 0), (0, −1, 1), (−1, 0, 1), (1, −1, 0), (0, 1, −1), (1, 0, −1), (−1, −1, 0), (0, −1, −1), (−1, 0, −1) is added or subtracted. After that, in the same manner, when returning to step S1602, additional values Ar, Ag, Ab are set to +2, −2, +3, −3, . . . in such a way that the distance √((Ar^2)+(Ag^2)+(Ab^2)) is changed sequentially from the smallest value to larger values.

In the above example, an order of changing the additional values Ar, Ag, Ab is the order of Ar, Ag, Ab, but it should be appreciated that the order in not limited to this order. Any order can be employed as long as the rule is observed in which after all combinations in which a distance from a color D[n] of a lattice point is 1 are completed, processing proceeds to combinations in which a distance from a color D[n] of a lattice point is √2.

Next, in step S1603, Di[n]=D[n]+Zi [Ar, Ag, Ab], which is obtained by correcting a color D[n] of a lattice point by a correction value Zi [Ar, Ag, Ab] that contains the additional value obtained as described above as components, is converted to a color of a uniform color space (L*, a*, b*). Conversion from an RGB space to an L*, a*, b* space is a well-known art and therefore will not be described here.

Next, in step S1604, a difference value (ΔE) between D[n] and Di[n] in a uniform color space is calculated. Here, a difference value ΔE can be represented by √ (ΔL^2)+(Δa^2)+(Ab^2). Supposing that Lab values of Di[n] and D[n] are (L1, a1, b1) and (L2, a2, b2) respectively, the following expressions are established.

$$\Delta L = \Delta L1 - \Delta L2$$

$$\Delta a = \Delta a1 - \Delta a2$$

$$\Delta b = \Delta b1 - \Delta b2$$

Then, in step S1605, it is determined whether ΔE obtained as described above is smaller than a predetermined threshold TH1. The threshold TH1 indicates whether a color difference can be identified and is set based on human visual characteristics. For example, since Japanese Patent Laid-Open No. 2000-301807 describes that in 0.8 to 1.6 "a color difference can be recognized in adjacent comparison" according to stipulations of JIS and various organizations, the threshold TH1 is set to 1.6 in the present embodiment.

In step S1605, if it is determined that the color difference ΔE is smaller than the threshold, D[n] and Di[n] are recognized as the same color by a human visual perception and therefore there is no use in performing correction with a correction value corresponding to the color difference, then returns to step S1602, without making the correction value to a candidate correction value. Then, as described above, processing in steps S1602 to 1605 will be repeated while additional values Ar, Ag, Ab are changed. On the other hand, in step S1605, if it is determined that the color difference ΔE is greater or equal to the threshold TH1, D[n] and Di[n] are visually recognized as different colors and therefore in step S1606, a correction value corresponding to the color difference is made to a candidate correction value and Di[n] corrected by this correction value is registered as data of a candidate patch (candidate color).

Lastly, in step S1607, a value of i is compared with a previously set number of candidate colors, m, processing in steps S1602 to S1606 will be repeated until the value of i becomes m.

Although the above calculation of ΔE has been described on the premise of CIE 1976 color difference model, ΔE may be calculated based on modified CIS 1994 color difference model or CIE2000 color difference model that is more faithful to the visual characteristics.

As described above, in the present embodiment, m candidate correction values or candidate patch data are basically set for an area specified as an area having color unevenness, and this value of m varies depending on which nozzle position in a nozzle array the specified area corresponds to.

More specifically, how color unevenness occurs may vary depending on a nozzle position in a nozzle array of a printing head. For example, when the printing head is composed of a plurality of chips, a degree of occurrence of color unevenness may be different between an overlapping portion between chips and portions other than the overlapping portion. In this case, if the value of m is uniformly set large on the assumption that a degree of the color unevenness to occur is large, the number of printed patches increases. As a result, if correction is performed on an area corresponding to a nozzle where degree of color unevenness that has occurred is small originally, unnecessary patches will be printed, causing unnecessary processing time and cost, as described previously.

Therefore, in the present embodiment, the number of candidate correction values or candidate patches, m, is determined according to a nozzle position in a nozzle array.

FIG. 10 is a flowchart illustrating processing to determine the number of candidate correction values, m[X], according to nozzle position information X of a nozzle array.

First, in step S601, area information [X] relating to a color and a nozzle position where color unevenness occurs, which are specified in step S503 illustrated in FIG. 5, is obtained. Then, in step S602, coordinate information indicating a nozzle position corresponding to the area information [X] is obtained with respect to a printing head or nozzle array of the ink color associated with the specified color information. The color specified as having color unevenness is a color generated by mixing different ink colors. Accordingly, it should be appreciated that, basically, each printing head or nozzle array corresponding to each of the different ink colors is specified, and nozzle coordinate information is obtained for each printing head or nozzle array.

Next, in step S603, by referring to a table, the number of candidate correction values or candidate patches is obtained based on the nozzle coordinates obtained corresponding to an area [X].

One example of the table is illustrated in association with step S603 in FIG. 10. According to this table, at a nozzle position 0 corresponding to an area [X], an effect due to variations of ejection characteristics such as an ejection volume is small and a direction of change is constant, and therefore the number of candidate correction values is set to be three. At a nozzle position k, an effect due to variations of ejection characteristics is small but a direction of change is not constant, and therefore the number of candidate correction values is set to be six. At a nozzle position n, an effect due to variations of ejection characteristics is large, and therefore the number of candidate correction values is set to be twelve.

Figure 11A:
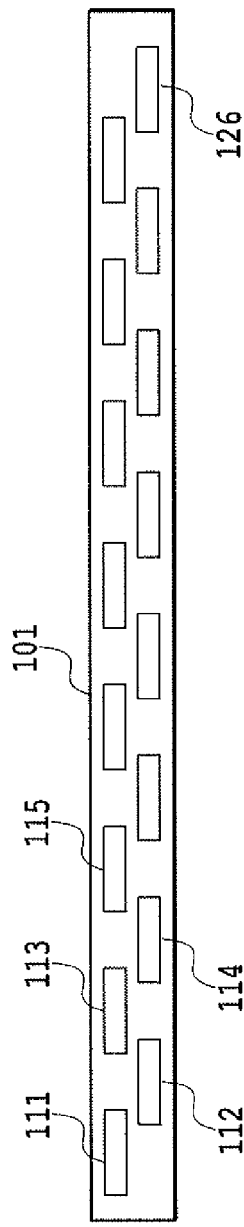
FIGS. 11A and 11B are diagrams illustrating examples of determination of the number of candidate correction values corresponding to the above nozzle positions.
Figure 11B:
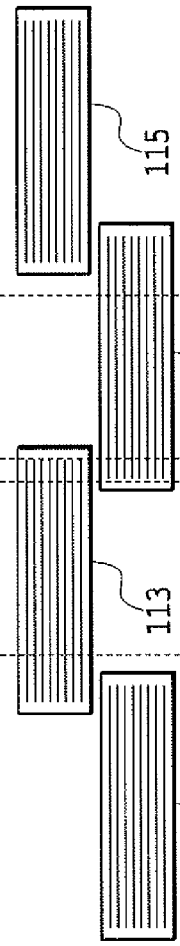

FIGS. 11A and 11B illustrate one example of how to determine the number of candidate correction values corresponding to a nozzle position that is described above. FIG. 11A illustrates a detail of the printing head 101 to eject a black (K) ink illustrated in FIG. 1, in which the printing head 101 is configured in such a way that a plurality of head chips, each having a plurality of nozzle arrays, are arranged in a zigzag manner. The printing heads 102 to 104 to eject cyan (C), magenta (M) and yellow (Y) respectively illustrated in FIG. 1 have the same configuration and therefore only the printing head 101 will be described below.

In FIG. 11A, each of reference numerals 111 to 126 denotes a chip having a plurality of nozzle arrays. An overlapping portion is provided between respective adjacent chips to each other in these chips, where printing regions by both nozzles overlap.

FIG. 11B illustrates an arrangement of the plurality of chips and a frequency of nozzle use corresponding to a nozzle position in the chip. As illustrated in FIG. 11B, each of the plurality of chips 112 to 115 has eight nozzle arrays ejecting k ink, as described in FIG. 1. These nozzle arrays are arranged in such a way that they are shifted against each other by one-eighth of a pitch of each nozzle arrangement. The plurality of chips 112 to 115 are arranged in such a positional relation that adjacent chips have a common overlapping portion 121 therebetween. That is, the overlapping portion 121 is composed of nozzles whose printing (ejecting) positions are common between adjacent two chips.

As seen from a graph illustrating a frequency of use in FIG. 11B, in a portion other than the overlapping portion (non-overlapping portion) in each head chip, since each nozzle of the eight nozzle arrays is alternately used for a common printing region, a frequency of use of each nozzle array is 1/L, (1/8). On the other hand, although 2×L(8) nozzles can be used in the overlapping portion 121, the use of each nozzle is controlled as follows. That is, in the center of the overlapping portion 121, control is performed so as to use nozzles of L/2 nozzle arrays on each of head chips that are adjacent to each other by this overlapping portion. That is, in this center portion, a frequency of use of each nozzle array is 1/2L (1/16). Between this center portion and the border of a non-overlap portion, L nozzle arrays of each of the head chips 113, 114 are used, and the frequency of use is set to be smoothly changed to 1/L of the non-overlapping portion. In the above nozzle control, it is preferable that a mask pattern is used to prevent a case where some nozzles are used all the time or never used, or almost all the time or almost never.

As described above, in what is called, an overlapping head illustrated in FIG. 11A, a frequency of use of the overlapping portion is relatively low and therefore variations of ejection characteristics are unlikely to occur due to the frequency of use. Therefore, in such a portion with low frequency of use, the number of candidate correction values, m[X] may be small. In the above example, if m is made to be proportionate to a frequency of use, the value of an overlapping portion, m, may be one half of that of the non-overlapping portion.

Another factor to determine the number of candidate correction values, m, includes a width of a printing medium to be used for printing. That is, a usage state of a nozzle varies depending on a nozzle position relative to the width of a printing medium.

Figures 12A, 12B, 12C:
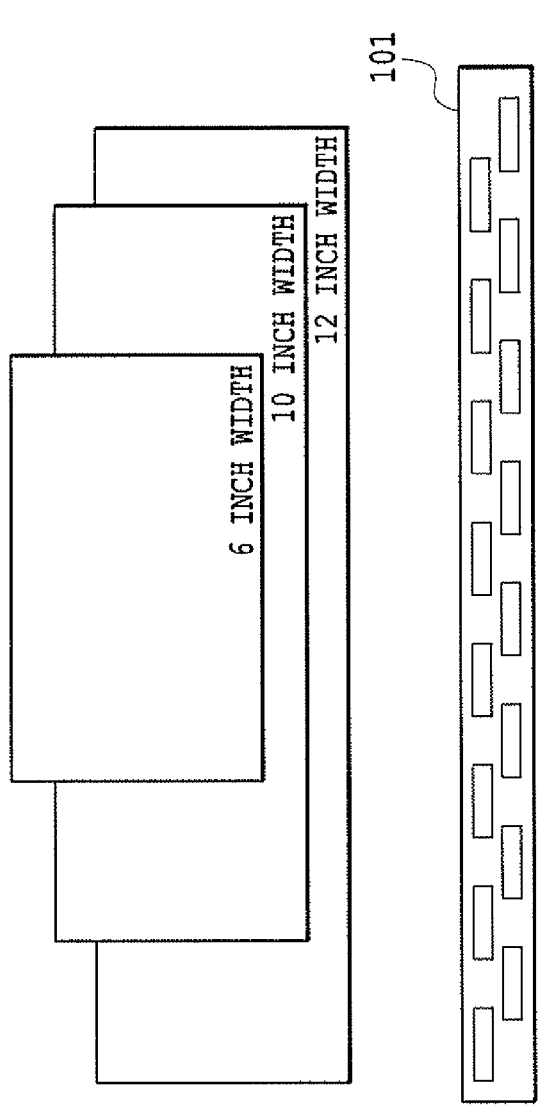
FIGS. 12A, 12B and 12C are diagrams illustrating positional relation between a size of printing paper width and nozzles.

FIGS. 12A, 12B and 12C are schematic diagrams illustrating a positional relation between the width of a printing paper and a nozzle position and, specifically, illustrates the number of printing papers having a paper width to be printed by a nozzle according to the position of the nozzle. As illustrated in FIG. 12A, if three sizes of printing papers whose widths are large, medium and small are used for printing on a center basis, a portion of nozzles indicated by A in FIG. 12C is used only when the large size printing paper is used. A portion of nozzles indicated by B is used when the large and medium size printing papers are used, and a portion of nozzles indicated by C is used when all of the large, medium and small size printing papers are used. In this way, according to a nozzle position corresponding to an area [X] specified as having color unevenness, the number of candidate correction values, m[X], can be determined by information on a frequency of use of the nozzle. In the present example, the portion C of nozzles may be most used and therefore the value of m is set to be larger. Since the border portion has a difference between use and nonuse, larger value may be employed as the number of candidate correction values, m[X].

Figure 13:
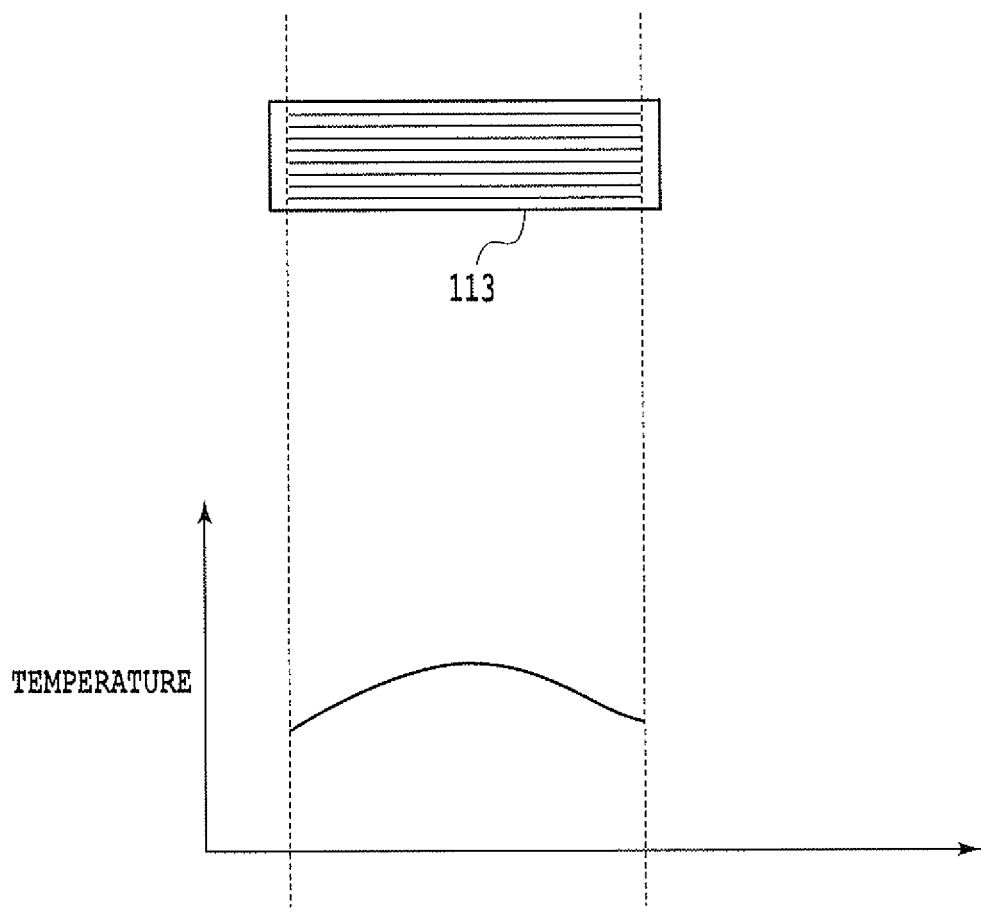
FIG. 13 is a diagram illustrating temperature distribution of the nozzle array during a printing operation.

Further, another factor to determine the number of candidate correction values, m, includes a temperature distribution in a nozzle array during a printing operation. That is, as illustrated in FIG. 13, heat is easy to be released and lost at end portions of a nozzle array and heat is easy to be accumulated at the center portion of the nozzle array, and therefore the center portion of the nozzle has a higher temperature than other portions therein. This temperature distribution occurs since most of heat from a heater used for ink ejection of a nozzle during printing operation is discharged with the ink, but part of the heat is accumulated within a head chip. If a temperature change is large, ejection volume variations become larger, and therefore in the example of temperature distribution in FIG. 13, the number of candidate correction values, m[X], is increased in an area [X] corresponding to nozzles of the center portion.

The heater used at a high temperature is likely to have burned deposit, as a result, ejection volume variations may become larger. Among a plurality of chips, since they have an effect on each other due to their positional relationships, they have different temperature characteristics. Furthermore, if a temperature is different between ink and a head chip periphery, a heat exchange occurs due to the temperature difference, and therefore the temperature characteristics may be different depending on a configuration of an ink supply flow path. Based on such temperature characteristics, the number of candidate correction values, m[X], may be determined.

As described in the above examples, the number of candidate correction values, m[X], can be determined based on the nozzle position information associated with factors to determine the number of candidate correction values. In this case, the corresponding relationship between nozzle positions and the number of candidate correction values illustrated in FIG. 10 can be determined based on any of the above factors or any combination of the above factors.

In step S504 illustrated in FIG. 5, as described above, a plurality of candidate patch data are generated based on candidate correction values, and the candidate patch data are arranged to generate the second image data. A patch that is used in the first test print without color unevenness correction processing may be arranged among and together with the patches of the second image data. This enables the user to compare the patch whose color unevenness is corrected by a candidate correction value with the patch without correction of the color unevenness and to see the effect. As will be described later, in step S506, at least one patch is selected from a plurality of patches, and there may be a case where color unevenness is the least distinct in a patch that is not subject to color unevenness correction processing depending on the intensity of color unevenness and a color correction value $Zi[n]$. As an option in such a case, if a patch that is not subject to color unevenness correction processing is arranged, selection can be performed while an error is suppressed to the minimum. Furthermore, an effect to avoid differences between printing trials can be obtained. For example, although a patch in the first test print that is not subject to color unevenness correction processing can be compared with a plurality of patches that were subject to color unevenness correction processing, colors of patches may be different to each other if print trials or printing papers are different. As a method to solve this, it is effective to employ a method to simultaneously print a patch that is not subject to color unevenness correction processing.

Returning to FIG. 5, in next step S505, the second image data generated in step S504 is printed, which will be hereinafter referred to as a second test print. More specifically, a patch printing control is performed to cause a plurality of candidate patches that are obtained by correcting a color to be corrected with a plurality of candidate correction values to be printed in contrast with a color to be printed by a plurality of nozzles other than the nozzles corresponding to the nozzle position information, which eject different colors of inks to a same area of a printing medium. The second test print is, for example, illustrated in FIG. 8A, and the user can see that a color of color unevenness at a position specified in step S503 is different in each of a plurality of candidate patches.

Next, in step S506, the user visually determines a patch whose color unevenness is most reduced from among a plurality of patches of the second test print, specifies the color correction number and receives the specified information.

Figure 8B:
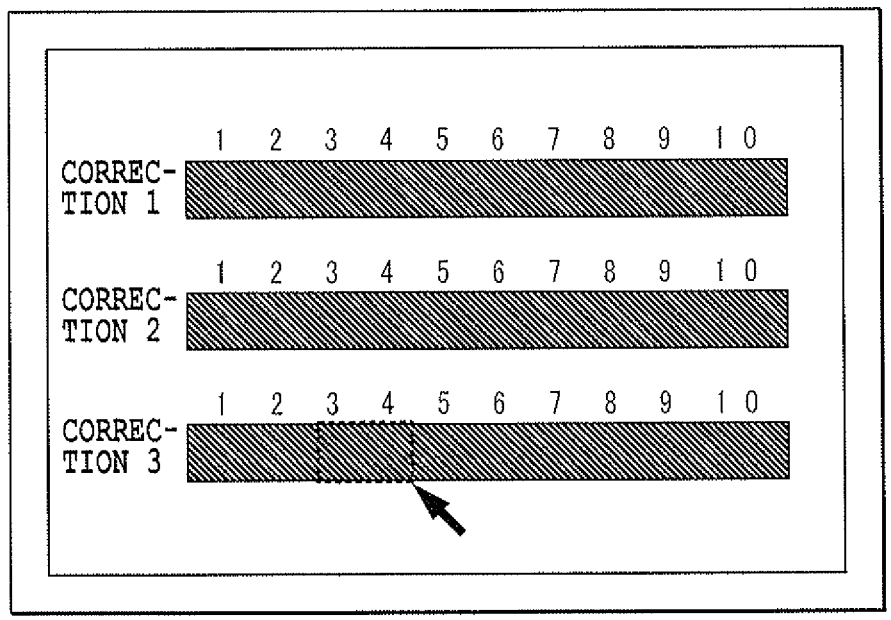
FIG. 8B is a diagram illustrating a user interface used in step S505 shown in FIG. 5.

FIG. 8B illustrates a user interface used in step S506. As illustrated in FIG. 8B, for example, if color unevenness of "Correction 3" is most reduced in m candidate patches in FIG. 8A, "nozzle positions 3 to 4" of "Correction 3" are selected with a cursor in the interface illustrated in FIG. 8B. Alternatively, color corrections and positions may be numbered and specified with the numbers, instead of the cursor illustrated in FIG. 8B. If there are two portions whose reduction of color unevenness is almost the same, these two portions may be specified.

If color unevenness cannot be reduced in any candidate patches, at least one patch whose color unevenness is most reduced is selected from color-corrected patches. Then, the second test print is performed again on the basis of the selected patch. That is, returning to step S504, where second image data is generated again. This image data is called third image data and this print is called third test print. In the candidate patch selected at this time, color unevenness is reduced at least compared with other color-corrected patches. In other words, in other color-corrected patches that are not selected, their candidate correction values $Zi[n]$ are too large. Therefore, when the third image data is generated, a candidate correction value $Zi[n]$ is set to be smaller compared with the second image data. For example, the candidate correction value $Zi[n]$ is generated by reducing the candidate correction value $Zi[n]$ in the second image data by half. This narrows a range to select color unevenness reduction in the third image data. That is, candidate patches to reduce color unevenness can be narrowed down by converging this processing. Even in the third test print, if color unevenness cannot be reduced, the above processing can be repeated to perform a fourth test print and the subsequent test prints.

In the above, processing has been described in which since in the second test print the candidate correction value Zi[n] is too large, color unevenness cannot be reduced. However, there is a case where since color, unevenness that has occurred is too intense, the color correction value Zi[n] of the second test print is too small and therefore the color unevenness cannot be corrected. In this case, on the contrary, color correction value Zi[n] is set to be larger in the third test print. In doing so, when the third test print is performed, it is configured that a color correction value Zi[n] can be specified on the user interface. The third test print image is generated on the basis of this specified value, and thereby a candidate patch that effectively can reduce color unevenness can be generated.

Next, in step S507, correction processing specified in step S506 is performed on an area [X] of a specified nozzle position. Specifically, a correction value Zi[X] is determined as a table parameter for an area [X] for the MCS processing section 404.

If a plurality of candidate patches are specified in the second test print in step S506, an average correction value of their candidate correction values, for example, is set to be a table parameter. For example, suppose that, among a plurality of specified patches, a candidate correction value of a first patch is processing to correct an RGB value of a lattice point to be corrected by (0, 0, 10) and a candidate correction value of a second patch is processing to correct an RGB value of a lattice point to be corrected by (0, 10, 0). In this case, color correction processing that is finally determined may be (0, 5, 5) obtained by averaging the RGB values or may be (0, 10, 10) obtained by taking an vector of these two values. In order to reduce color unevenness with a high accuracy by a finite number of candidate patches illustrated in FIG. 8A, it is effective to perform such an adding method to simultaneously specify a plurality of color correction patches.

As described above, in step S507, a newly generated table parameter is stored in the table of the MSC processing section 404. Specifically, a table parameter of each lattice point is associated with a lattice point to be corrected for each area [X] corresponding to a nozzle position and stored in a memory. The memory is the HDD 303 of the host PC in the present embodiment, but a nonvolatile memory in a printer may be used. In either case, it is preferable that the generated table parameter is handled without being lost, e.g. at a timing when power is turned off.

As described previously, processing in step S508 of FIG. 5 is performed as image processing that accompanies printing operation at a timing different from that of processing in steps S501 to S507 described above. That is, in normal printing operation, the processing is performed as part of a process performed by the image processing accelerator 316 according to a series of image processing illustrated in FIG. 4A and corresponds to a process performed by the MCS processing section 404 in FIG. 4A.

First, the image processing accelerator 316 uses the table parameter generated as described above to correct device color image data D[X] of an area [X]. Next, the image processing accelerator 316 performs processing by the ink color conversion processing section 405, HS processing section 406, TRC processing section 407 and quantization processing section 408 on the corrected device color image data Dm[X].

Then, the output section 409 prints dots on the printing paper 106 on the basis of the obtained binary data.

Figure 14A:
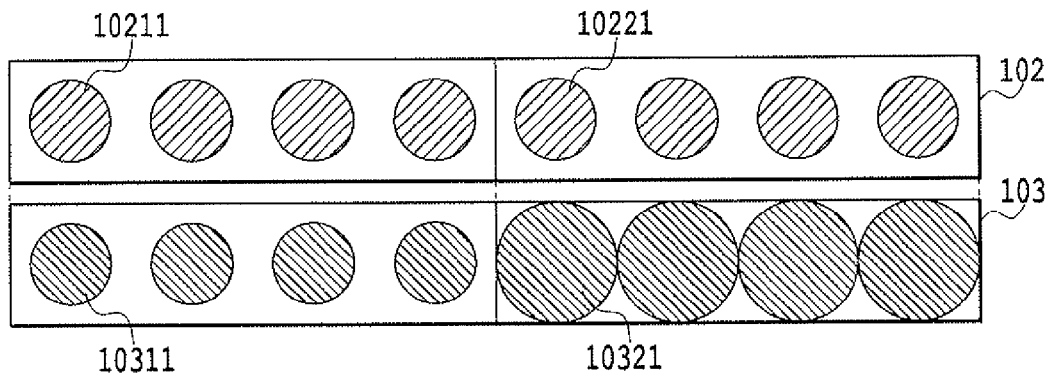
FIGS. 14A and 14B are diagrams illustrating an image printed in step S508 of FIG. 5.
Figure 14B:
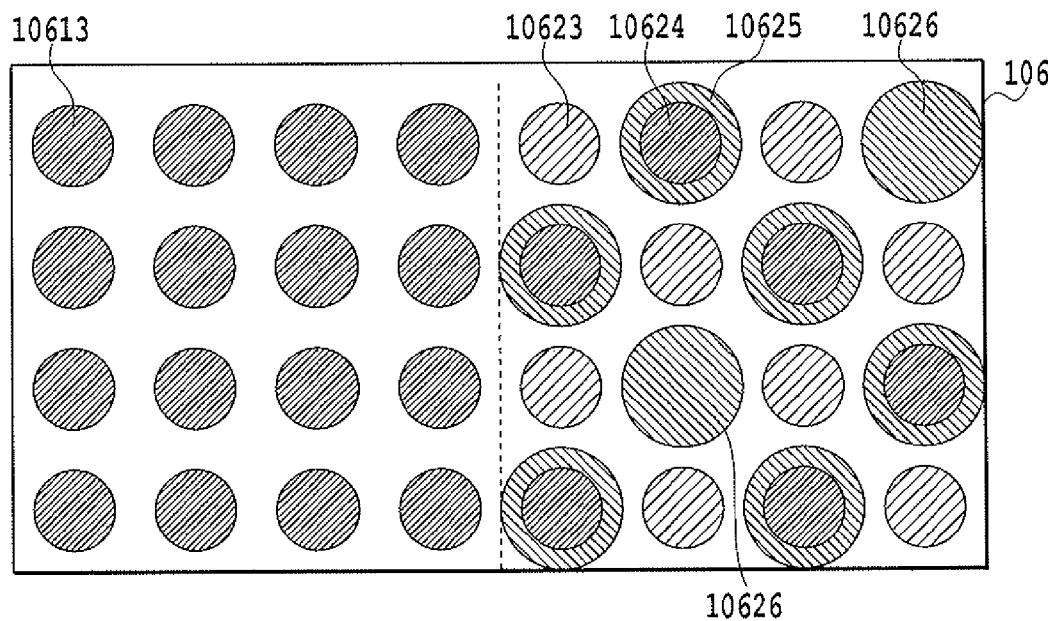

FIGS. 14A and 14B are diagrams illustrating an image printed in step S508 of FIG. 5. FIG. 14A, similarly to FIG. 7A, illustrates ejection volume characteristics of nozzles of the cyan printing head 102 and magenta printing head 103. When correction is performed by the MCS processing, dots without overlapping of cyan dots, such as magenta dots 10626 in an area on the right in FIG. 14B exist. That is, cyan dots are still printed on the magenta dots 10626 in the case that image data is subjected only to the HS processing as the printed result shown in FIG. 7B. On the other hand, the image data has a reduction of cyan color, resulting in decrease of the number of the cyan dots that are printed on the magenta dots.

As described above, in the present embodiment, for a color (a set of R, G, B) whose color difference tendency is significantly changing, patches (an image for measurement) are printed on a printing medium, the color and nozzle position where color unevenness has occurred are visually specified by the user, and a table parameter is obtained based on the result. Generally, color unevenness tendency depends on both of (1) a color to be printed and (2) printing characteristics of each ink color with respect to a printing medium. With respect to (1), for example, color unevenness of blue is more conspicuous than color unevenness of red even if they both have ejection volume variations. Further, the printing characteristics (2) of respective ink colors include factors that affect a dot diameter, such as a dot shape, an ink penetration rate and a printing medium type, in addition to the ejection volume described above. It is obvious that the color difference amount depends on a combination of printing characteristics of ink colors used to print the ink color and does not depend on printing characteristics of ink colors that are not used. Accordingly, the type and number of ink colors varies depending on the color of an object pixel. Therefore, in some colors, only one ink color is involved and the color difference does not occur.

In the above, the case where all four nozzles in the same area have a larger ejection volume than a standard ejection volume has been described by way of example, but ejection characteristics of respective nozzles in one area may be different. Even in such a case, correction processing is performed in such a way that an average color difference in the same area is obtained and color unevenness is corrected with all four nozzles, thereby attaining the above effects.

Figure 15:
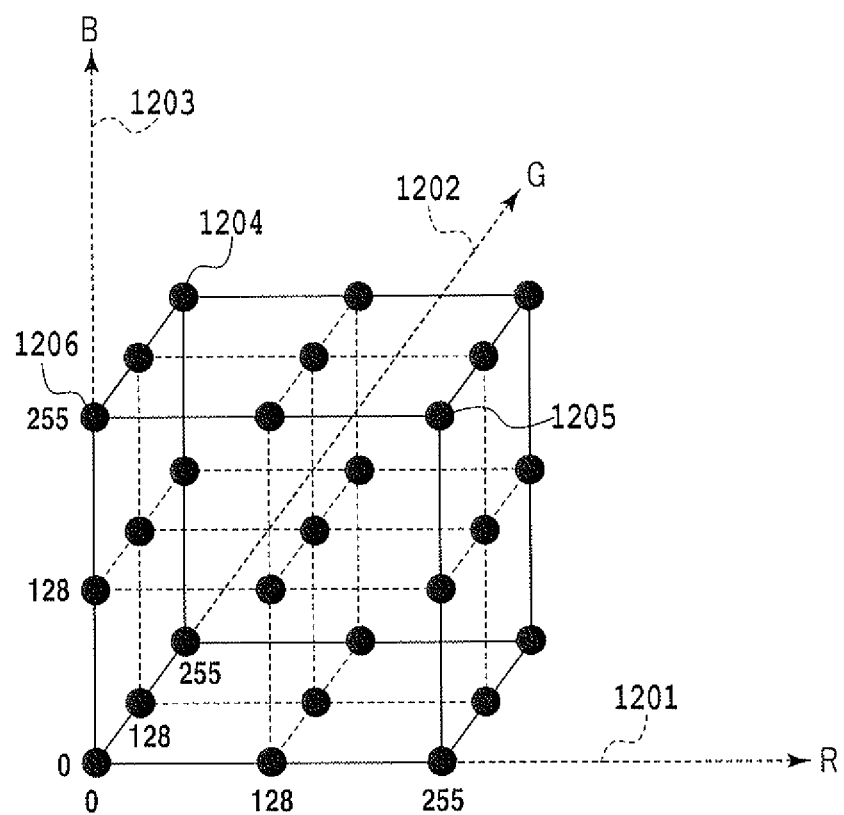
FIG. 15 is a diagram showing lattice points that are defined by equal intervals in a RGB coordinate.

If a color whose color difference tendency is large cannot be specified, a mode may be employed in which a correction value is obtained for each of 27 lattice points of coordinates at regular intervals in an RGB space, for example, as illustrated in FIG. 15. That is, a plurality of candidate correction values are set for each of the lattice points, patches are printed for the plurality of candidate correction values, and a table parameter is generated for each of the lattice points on the basis of the correction values obtained from the patches.

In the above, it is described that the processing to generate table parameters described with reference to FIG. 5 and other FIGS. is performed by the CPU 311 of the printer 100, but this processing may be performed in the host PC 300 illustrated in FIG. 2.

As described above, according to the present embodiment, input and output are performed with RGB signal values in the MCS processing section 404. An inkjet printer that performs control with RGB signal values has three advantages, which will be described below.

A first advantage is to be able to reduce data size. If processing is performed with ink color signals, at least four signal values of CMYK are necessary. Generally, in an inkjet printer, in addition to CMYK, light cyan (Lc) that is lighter than C and light magenta (Lm) that is lighter than M may be used. In this case, six color inks, that is, six signal values are necessary. Furthermore, in some inkjet printers, gray (Gr) red (R) and green (G) inks are used. Therefore, total nine color inks are necessary. As described above, since the MCS processing section 404 performs processing by an LUT, processing with ink color signals increases combinations of the signals, that is, data size. Since color development varies depending on an ink permeability in an inkjet printer, the color development characteristics are nonlinear. Therefore, it is necessary to narrow intervals between lattice points in a three-dimensional LUT, resulting in increase of the number of lattice points. As described above, as the number of colors (degree) increases, the number of lattice points (i.e. data size) grows exponentially. In addition, since in the MCS processing section 404, a table parameter is stored for each area corresponding to a nozzle position, a system load further increases. To take an LUT of an 8 bit (1 Byte) signal value as an example, if 17 lattice points are prepared for one color, the LUT of RGB needs 4,913 lattice points (17 cubed) and therefore becomes an about fifteen kByte LUT (1 Byte×3 signal values×4,913 points=about 15 kByte). In the case of four colors of CMYK, an LUT needs 83,521 lattice points (17 raised to the fourth power) and therefore becomes an about 334 kByte LUT (1 Byte×4 signal values×83, 512 points=about 334 kByte). That is, when the number of colors increases only by one, the data size increases about 22-fold. Assuming that there are 100 areas corresponding to nozzle positions, a four-dimensional LUT of CMYK has a data size of about 33 MByte. In this way, in the present embodiment, taking reduction of data size into consideration, processing in the MCS processing section 404 is performed using three signal values of RGB.

A second advantage is to be able to avoid an unexpected situation caused by an ink saturation. A change of an LUT of ink color signals in the present processing has an influence on an ink permeability to a printing medium. In an inkjet printer, an ink ejecting amount is fixed according to a printing medium. However, there is a case, as in the case of the second test print performed in step S505, where an ink color signal value significantly changes from a conventional value in some patches and therefore the ink volume exceeds a saturation volume of the printing medium. As a result, ink printed on the printing medium is outputted with being less dried than usual. Such a problem can be avoided by controlling RGB signal values that are independent from CMYK signal values that control an ink ejection volume.

Figure 16:
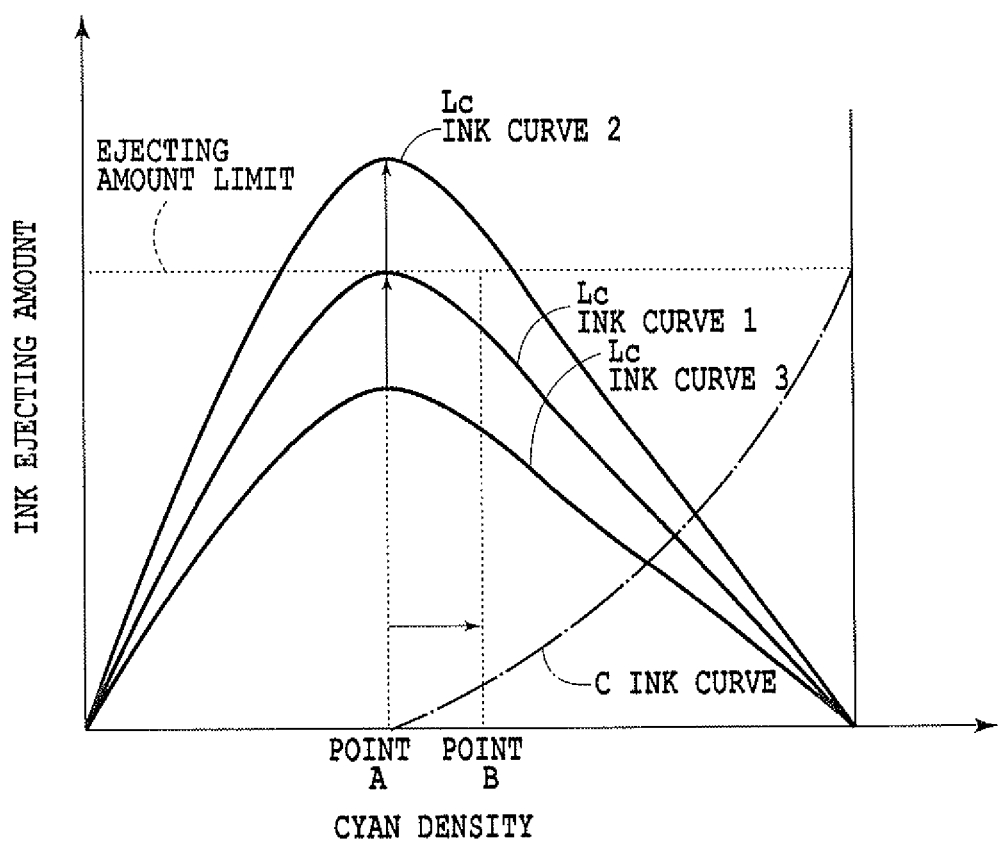
FIG. 16 is a graph illustrating ink ejection amount of ink having cyan hue.

A third advantage is to be able to reduce graininess of a printed image. Take, as an example, an ink volume used in a gradation from a density value, zero, to a maximum density value (light cyan to deep cyan) in a cyan hue. In FIG. 16, a curve indicating an Lc ink ejecting amount is an "Lc ink curve 1" and a curve indicating a C ink ejecting amount is a "C ink curve". Feeding of an Lc ink starts at a density of zero and the feed volume is gradually increased. Next, a feed volume of Lc ink is being reduced and a feed volume of C ink is being increased by the same volume of the reduced Lc ink, which can reproduce a cyan gradation. At this time, graininess can be reduced if a C ink is fed in a state where an Lc ink ejecting amount reaches a ejecting amount limit (saturation volume), that is, in a state where a cyan color is deepened by the Lc ink. Due to such characteristics of an inkjet printer, the more volume of Lc ink is used, the more graininess can be reduced. Here, according to the present embodiment, in the second test print of step S505, a patch whose density is changed from that of a patch of a color specified in step S503 is printed. In doing so, however, if the patch of the color specified in step S503 is a point A illustrated in FIG. 16, an Lc ink ejecting amount needs to be changed from the "Lc ink curve 1" to the "Lc ink curve 2" in order to generate a patch with a higher density by using CMYK signal values, which results in exceeding the ejecting amount limit. On the contrary, the Lc ink ejecting amount needs to be reduced in order to prevent saturation of the ink ejecting amount while changing the ink ejecting amount. That is, the Lc ink ejecting amount needs to be changed to an "Lc ink curve 3". However, in the "Lc ink curve 3", an Lc ink volume used is small and therefore graininess is distinct. Here, taking the reduction of graininess into consideration, as a advantage of the present embodiment, the second test print is generated with RGB signal values, not CMYK values, by using the "Lc ink curve 1". In generating a color correction patch, by converting the point A to the point 13, for example, the second test print can be generated without changing an ink feed condition.

(First Variation)

Figure 4B:
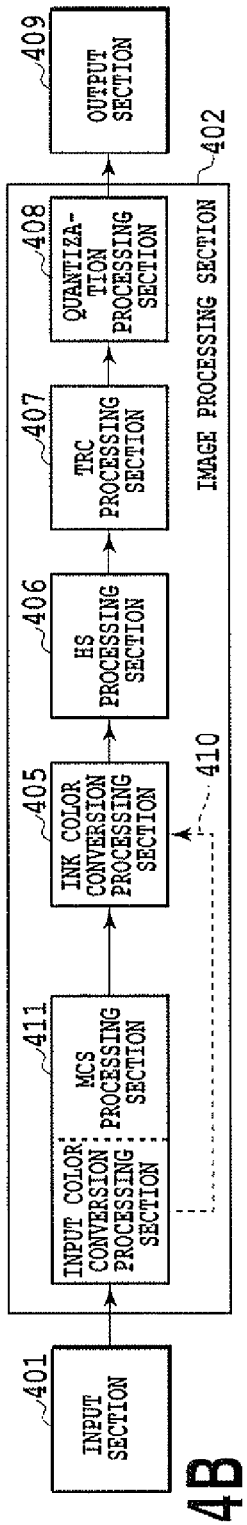

FIG. 4B is a block diagram illustrating a configuration of an image processing section in an inkjet printer according to a first variation. In FIG. 4B, since the respective sections indicated by Nos. 401 and 405 to 409 are identical to those indicated by the same Nos. in FIG. 4A, the explanation of them will be omitted. The configuration of the present variation is different from the configuration illustrated in FIG. 4A in that an input color conversion processing section and an MCS processing section are integrated as one processing section.

Specifically, an input color conversion processing & MCS processing section 411 uses one table generated by combining a table of the input color conversion processing section and a table of the MCS processing section. This allows for color difference correction processing directly on image data inputted from the input section 401, thereby outputting device color image data whose color difference has been reduced.

Figure 17:
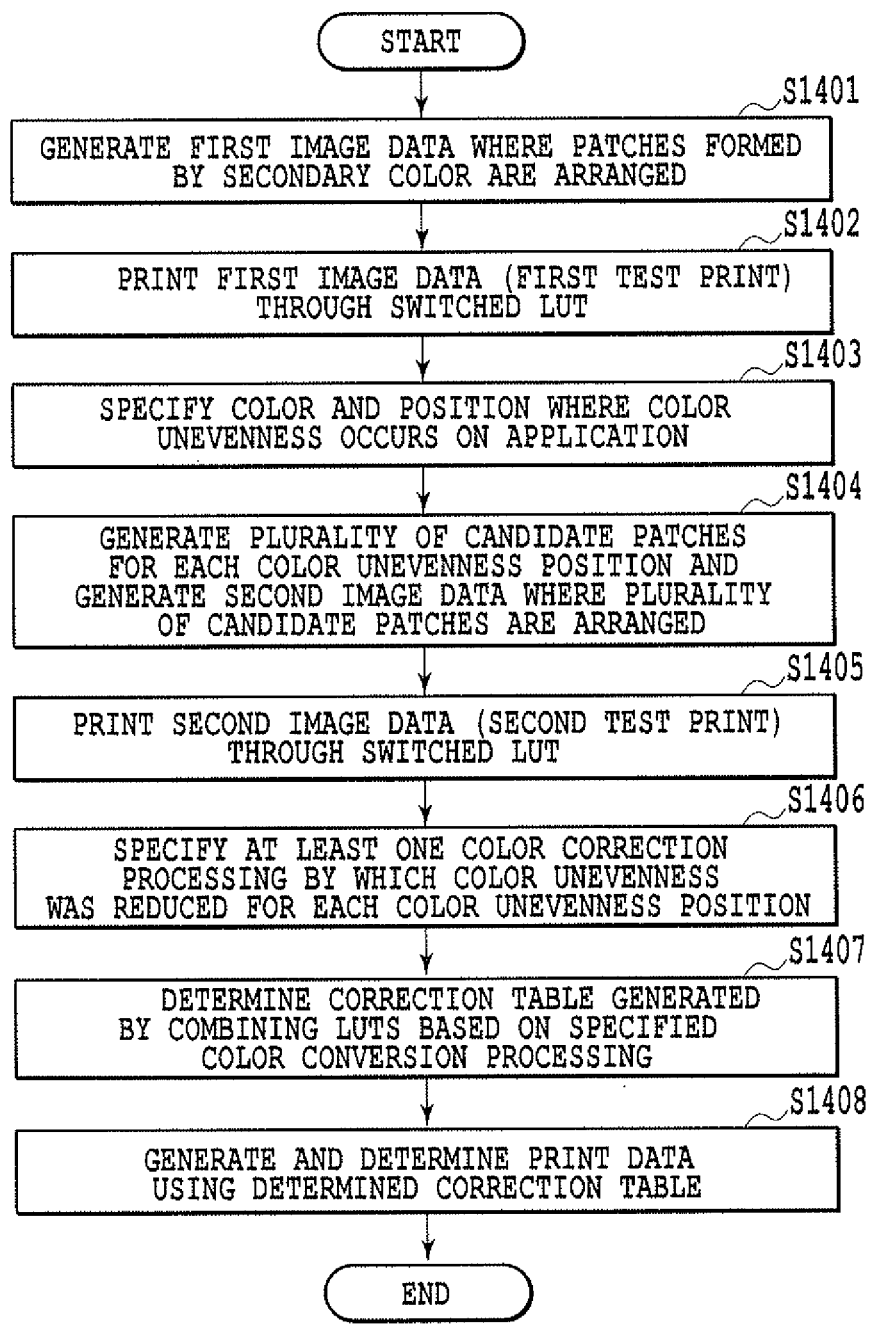
FIG. 17 is a flow chart, illustrating processing for generating parameters of a table to be used by an MCS processing section 404 illustrated in FIG. 4B and processing by the MCS processing section 404 using the table in image processing to generate print data, respectively.

FIG. 17 is a flow chart illustrating processing to generate parameters of a table used in the input color conversion processing & MCS processing section 411 and MCS processing using the table in image processing to generate print data.

FIG. 17 illustrates processing that is performed by the CPU 311 and generates parameters for the LUT. Processing different from the processing illustrated in FIG. 5 is processing in steps S1402, S1405 and S1407.

In processing of step S1402, only a portion corresponding to an input color conversion processing section of the input color conversion processing & MCS processing section 411 is made to function, and MCS processing is skipped through a bypass processing path indicated by a dash line 410. Specifically, the input color conversion processing & MCS processing section 411 is configured to be able to use two tables by switching. That is, for input image data I[X], a table having color conversion W' in which the input color conversion processing and the processing of the MCS processing section are combined, which will be described below, as table parameters and a table having table parameters of only the input color conversion processing are switched to be used. In printing an image for measurement, the table of only the input color conversion processing is used by switching. After this processing, in the same manner as the first embodiment, processing proceeds through the ink color conversion processing section 405, HS processing section 406, TRC processing section 407 and quantization processing section 408 to the output section 409, where a patch is printed on the printing paper 106. In step S1405, similarly, a table is used by switching as described above in the input color conversion processing & MCS processing section 411. In step S1407, table parameters of a combined LUT are determined.

According to the first variation described above, since the color conversion processing & MCS processing section 411 uses the combined LUT to perform the same processing as the first embodiment, color unevenness can be reduced similarly to the first embodiment. In the present variation, since conversion is collectively performed using one LUT, a region to be prepared for the LUT can be reduced and a processing speed can be improved in comparison with the first embodiment.

(Second Variation)

Figure 4C:
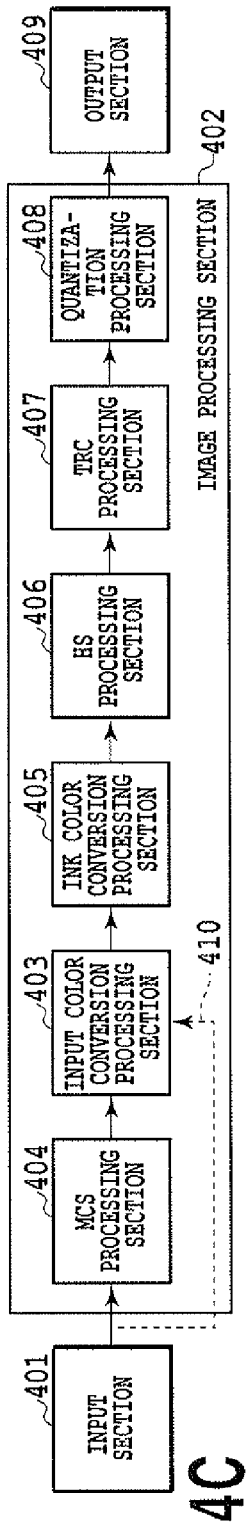

FIG. 4C is a block diagram illustrating a configuration of an image processing section according to a second variation of the present embodiment. Processing to generate table parameters for the MCS processing section and processing by the MCS processing section in the present variation are the same as those illustrated in FIG. 5 except that in the present variation the processing by the MCS processing section 404 is performed before processing by the input color conversion processing section 403. This increases independence of modules. For example, the present variation can be applied, as an expanded function, to an image processing section that does not include an MCS processing section. Or, the processing can be performed in the host PC.

(Third Variation)

Figure 4D:
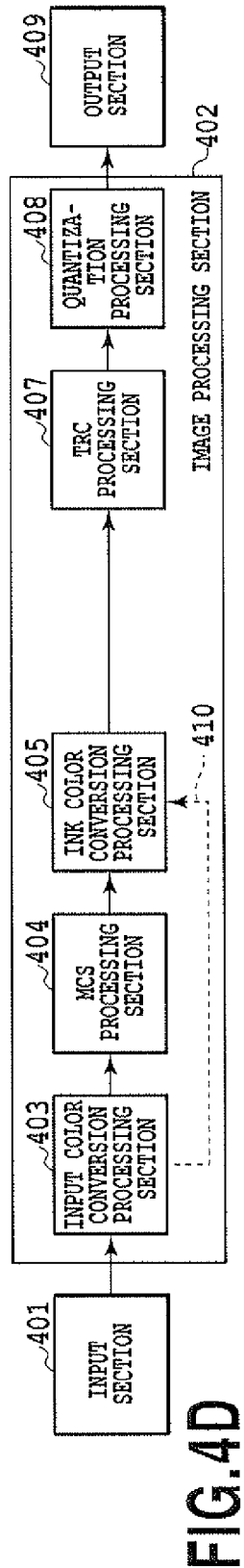

FIG. 4D is a block diagram illustrating a configuration of an image processing section according to a third variation. As illustrated in FIG. 4D, the present variation relates to a mode in which the HS processing section 406 illustrated in FIGS. 4A to 4D is not employed.

Processing to generate table parameters for the MCS processing section and processing by the MCS processing section in the present variation are the same as those illustrated in FIG. 5 except that in the present variation head shading is not performed in the HS processing section. That is, in the present variation, table parameters for the MCS processing section are not generated on the basis of data that were subject to HS processing as described in the above embodiment and variations. In the present variation, table parameters for the MCS processing section can be generated and image processing can be performed according to processing illustrated in FIG. 5.

Figure 18A:
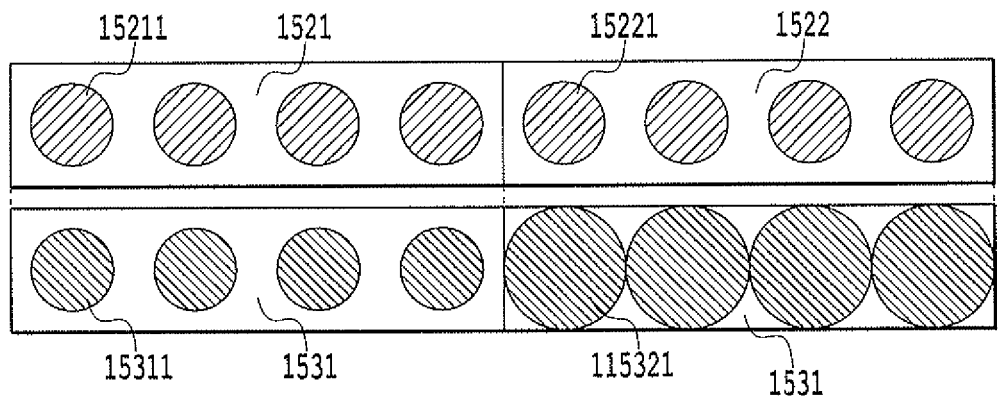
FIGS. 18A and 18B are diagrams illustrating printed condition of patches according to a third variation of the first embodiment.
Figure 18B:
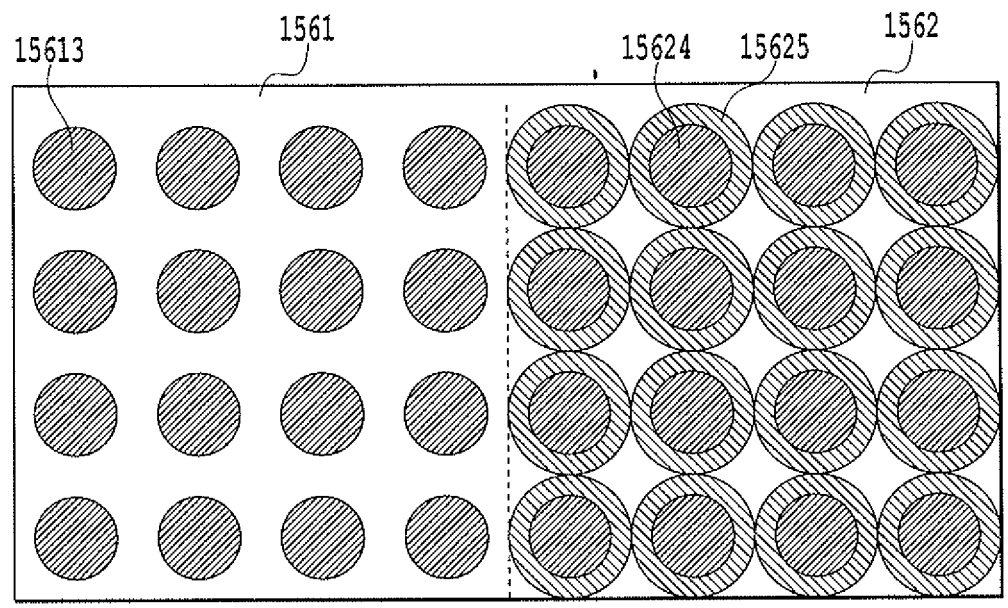

FIGS. 18A and 18B illustrate a printed state of a patch according to the present variation. FIG. 18A illustrates an example where four nozzles corresponding to a second area of nozzles of the magenta printing head 103 have a larger ejection volume than a standard ejection volume, which is similar to the example illustrated in FIG. 3A. In the present variation, since image data representing blue (K, C, M, Y)=(0, 255, 255, 0) was not subject to HS processing, a blue patch illustrated in FIG. 18B is printed. That is, even in the second area that includes nozzles with a larger ejection volume than a standard ejection volume, the same number of magenta dots and cyan dots are printed. As a result, a color difference to magenta occurs in the second area.

Based on these patches, as table parameters for the MCS processing section 404 according to the present variation, a correction value to reduce magenta color is generated. By performing such a correction, even in the present variation that does not include an HS processing section, a printing state illustrated in FIG. 14B can be obtained in printing blue data and a color difference can be reduced.

In the present variation that does not include an HS processing section, a table for HS processing is unnecessary and therefore processing such as "a pattern printing "colorimetry" and "correction parameter operation" for HS processing is unnecessary. As a result, a memory and the time and cost for HS processing can be reduced.

The first embodiment and first to third variations thereof described above illustrate an example each, and any configuration can be used as long as the configuration can reduce color unevenness that is the effect of the present invention. For example, if a color that is relatively uneven between areas can be reduced, color unevenness that is a problem to be solved by the present invention becomes indistinct. Therefore, correction for making whole color unevenness similar to the color of the region surrounding the color unevenness is not necessarily needed.

In the above embodiments, a region corresponding to nozzle positions of four nozzles is set to one unit area as a minimum unit for performing MCS processing, but the present invention is not limited to this unit. A region corresponding to more than four nozzles may be set to one unit area, or MCS correction may be performed for every one nozzle. Furthermore, the number of nozzles belonging to each area is not necessarily the same, but the number of nozzles belonging to one area may be properly set depending on characteristics of a device.

The above embodiments describe with respect to an example in which image data inputted in an RGB format are subject to processing such as MCS processing, and then converted to image data in a CMYK format that corresponds to ink colors used in a printer. However, it should be appreciated that the present invention is not limited to such a mode. Image data that is subject to MCS processing may be in any format such as L* a* b*, Luv, LCbCr, and LCH instead of the RGB format.

(Fourth Variation)

Figure 19:
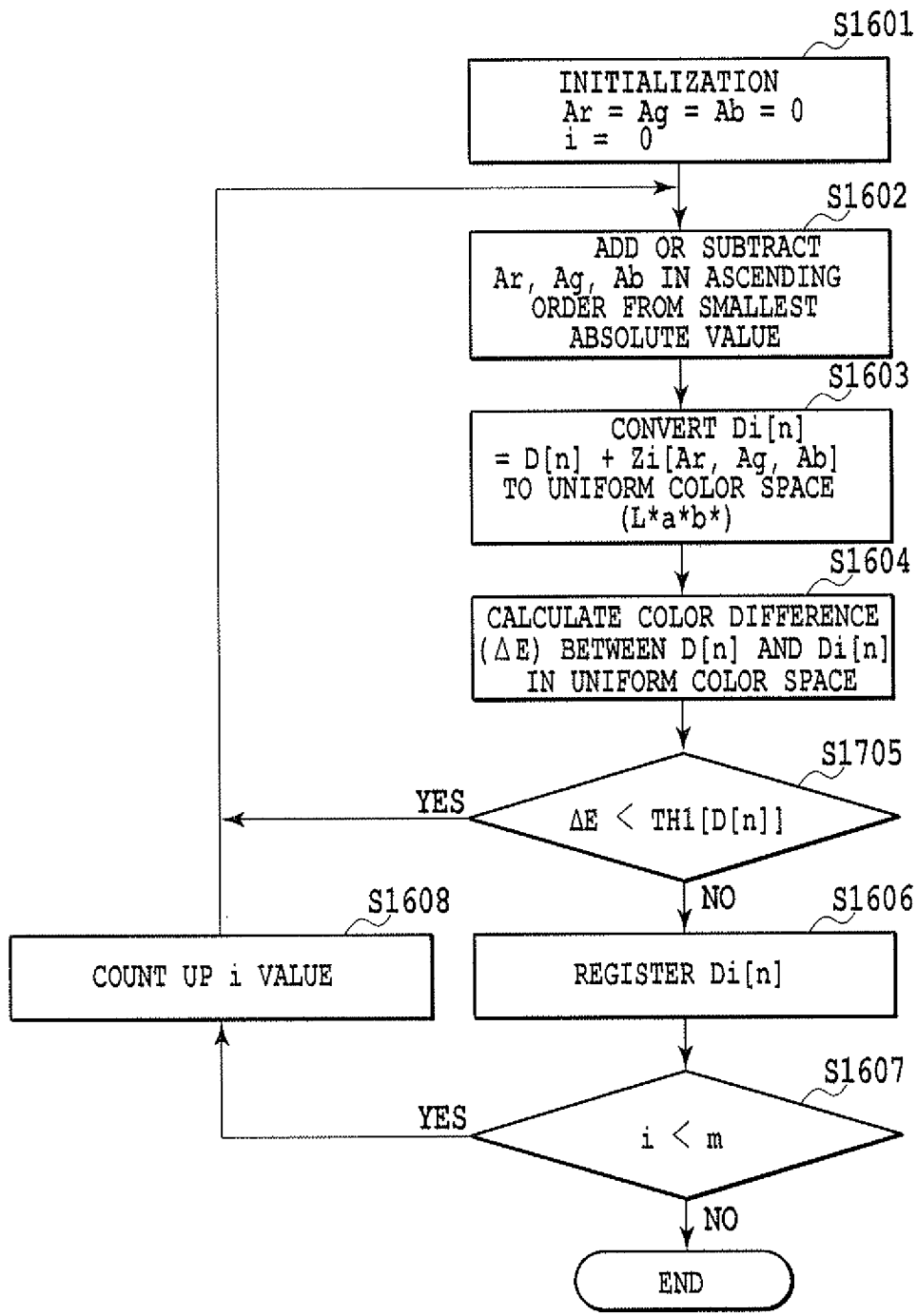
FIG. 19 is a flow chart illustrating a procedure of processing to determine a plurality of candidate correction values according to fourth variation of the first embodiment.

FIG. 19 is a flow chart illustrating a procedure of processing to decide a plurality of candidate correction values according to a fourth variation, which is similar to the processing to decide candidate correction values according to the first embodiment illustrated in FIG. 9.

Processing of the present variation is different from the processing illustrated in FIG. 9 in that a threshold used in determination in step S1705 varies depending on a color having color unevenness. That is, a CIELab color space used in the present processing is a uniform color space, and a color discrimination threshold is disproportionate in terms of visual characteristics. With respect to this, MacAdam's deviation ellipse and Nickerson's color-difference formula is known in, e.g. "New Color Handbook, the second edition, edited by The Color Science Association of Japan, Published by University of Tokyo Press".

As illustrated in step S1705 of FIG. 19, the discrimination threshold TH1 [D[n]] is set which can be visually recognized as color matching depending on a color D[n] having color unevenness. That is, in step S1705, the calculated ΔE is compared with the threshold TH1 [D[n]] corresponding to the color D[n], instead of a previously set threshold TH1, to determine whether they are visually recognized as color matching.

According to the present variation, since a threshold experimentally can be set for each color, a threshold can be set in such a way that it is finely set in the vicinity of an achromatic color where visual perception is sensitive to a color difference and it is roughly set in the vicinity of a high saturation color where visual perception is not sensitive to a color difference. This TH1 [D[n]] is previously set as a lookup table (LUT).

(Fifth Variation)

Figure 20:
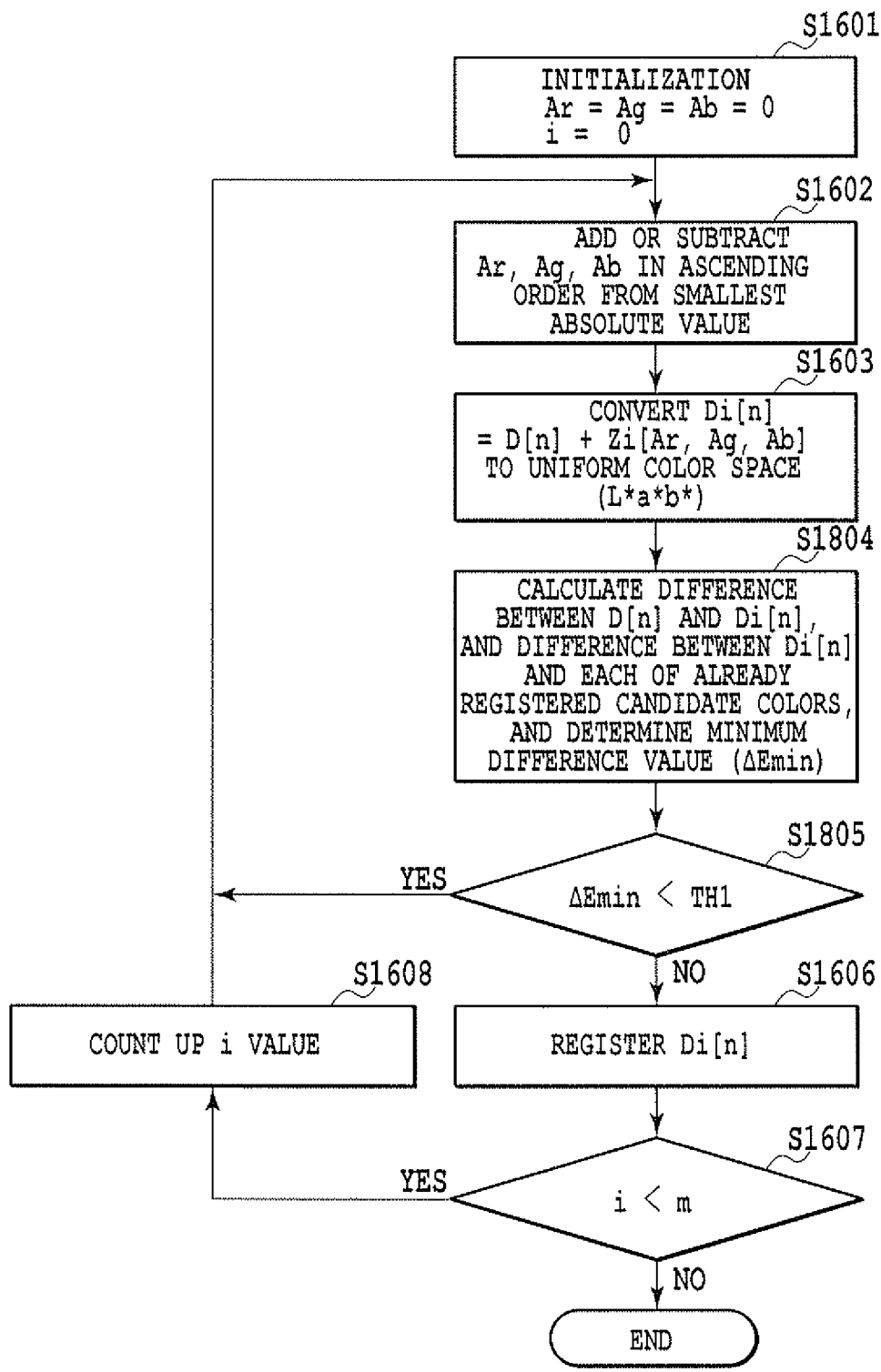
FIG. 20 is a flow chart illustrating a procedure of processing to determine a plurality of candidate correction values according to fifth variation of the first embodiment.

FIG. 20 is a flow chart illustrating a procedure of processing to decide a plurality of candidate correction values according to a fifth variation, which is similar to the processing to decide candidate correction values according to the first embodiment illustrated in FIG. 9.

Processing in the present variation that is different from the processing illustrated in FIG. 9 is processing to obtain a color difference among candidate correction values in step S1804. In the embodiment illustrated in FIG. 9, a color that is different by greater or equal to a predetermined threshold from a color D[n] to be corrected on the basis of human visual characteristics is set as a candidate color. Meanwhile, in the present variation, a color that is different by greater of equal to a predetermined value from another candidate color is also set as a candidate color. In other words, in step S1804, a difference between Di[n] and D[n], that is, the candidate correction value Zi obtained in step S1602, as well as a difference between a candidate correction color Di[n] that was corrected by this candidate correction value and each of already registered candidate colors are calculated. Then, among these differences, a minimum difference (color difference) value ($\Delta$Emin) is determined. Then in next step S1805, $\Delta$Emin and TH1 are compared to determine whether they are color matching.

In processing illustrated in FIG. 9, a color that is different from a color having color unevenness to be corrected is set as a candidate color, and there is a case where when candidate colors are compared with each other, they are color matching. That is, since similar colors exist as candidate colors, the user may not decide which to select. In the present variation, since all candidate colors are registered with a predetermined color difference, a candidate color, can be more effectively set.

(Sixth Variation)

Figure 21:
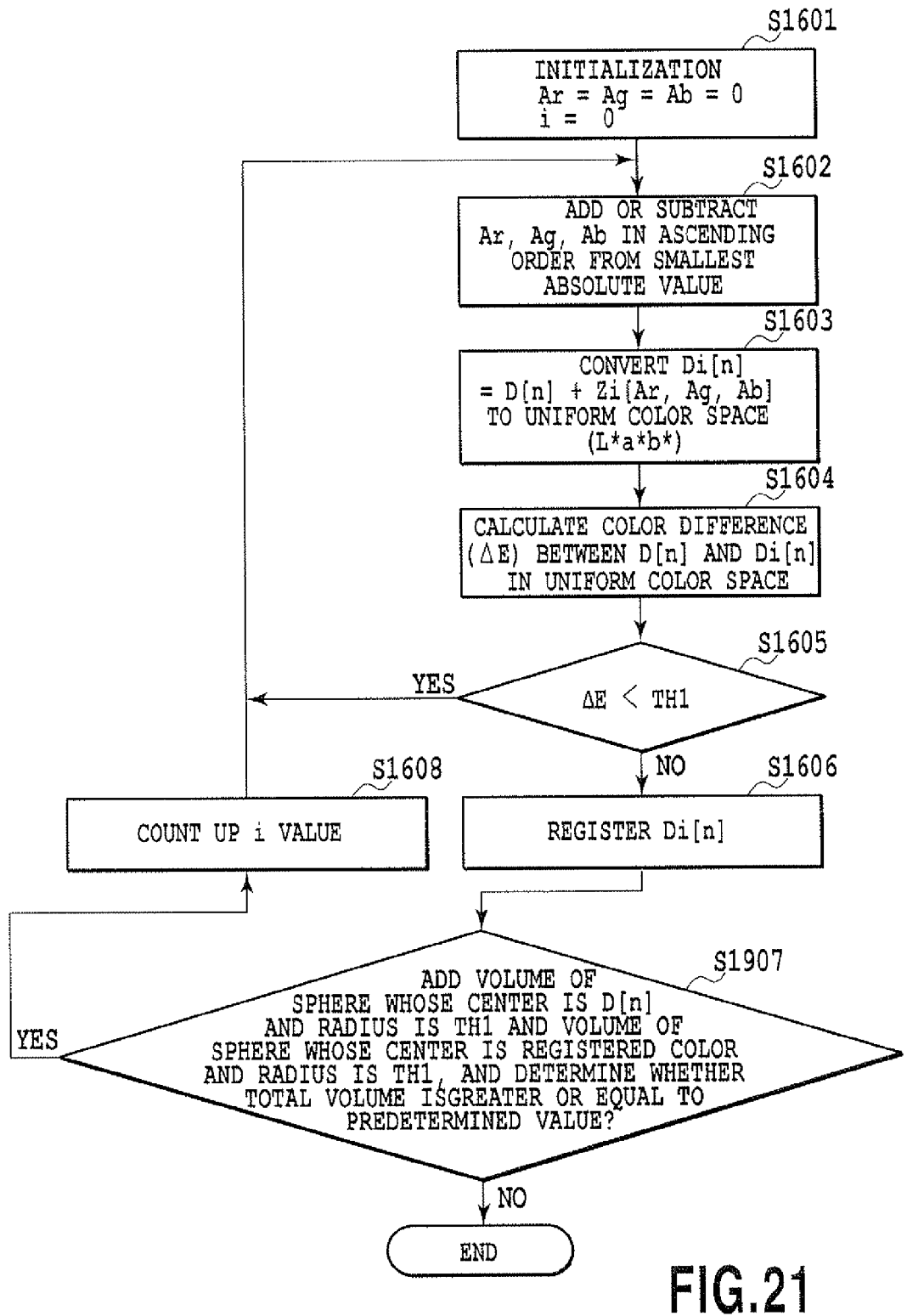
FIG. 21 is a flow chart illustrating a procedure of processing to determine a plurality of candidate correction values according to sixth variation of the first embodiment.

FIG. 21 is a flow chart illustrating a procedure of processing to decide a plurality of candidate correction values according to a sixth variation, which is similar to the processing to decide candidate correction values according to the first embodiment illustrated in FIG. 9.

The processing in the present variation that is different from the processing illustrated in FIG. 9 is the processing in step S1907. That is, in the processing in FIG. 9, once a predetermined number of candidate colors are registered, processing terminates whereas in the present variation, termination is determined based on whether a previously set candidate color range can be covered, not the number of candidate colors.

In step S1907 in FIG. 21, a volume of a sphere whose center is a color having color unevenness D[n] and radius is TH1 and a volume of a sphere whose center is each of registered candidate colors Di[n] and radius is TH1 are calculated, and it is determined whether total volumes obtained by adding these two volumes (removing the overlapping portion) is greater or equal to a predetermined value. This total volume corresponds to a region of a color that can be selected from candidate colors by the user. If the volume is greater or equal to a certain volume, it is determined that correction is possible and the present processing is terminated.

(Seventh Variation)

Figure 22:
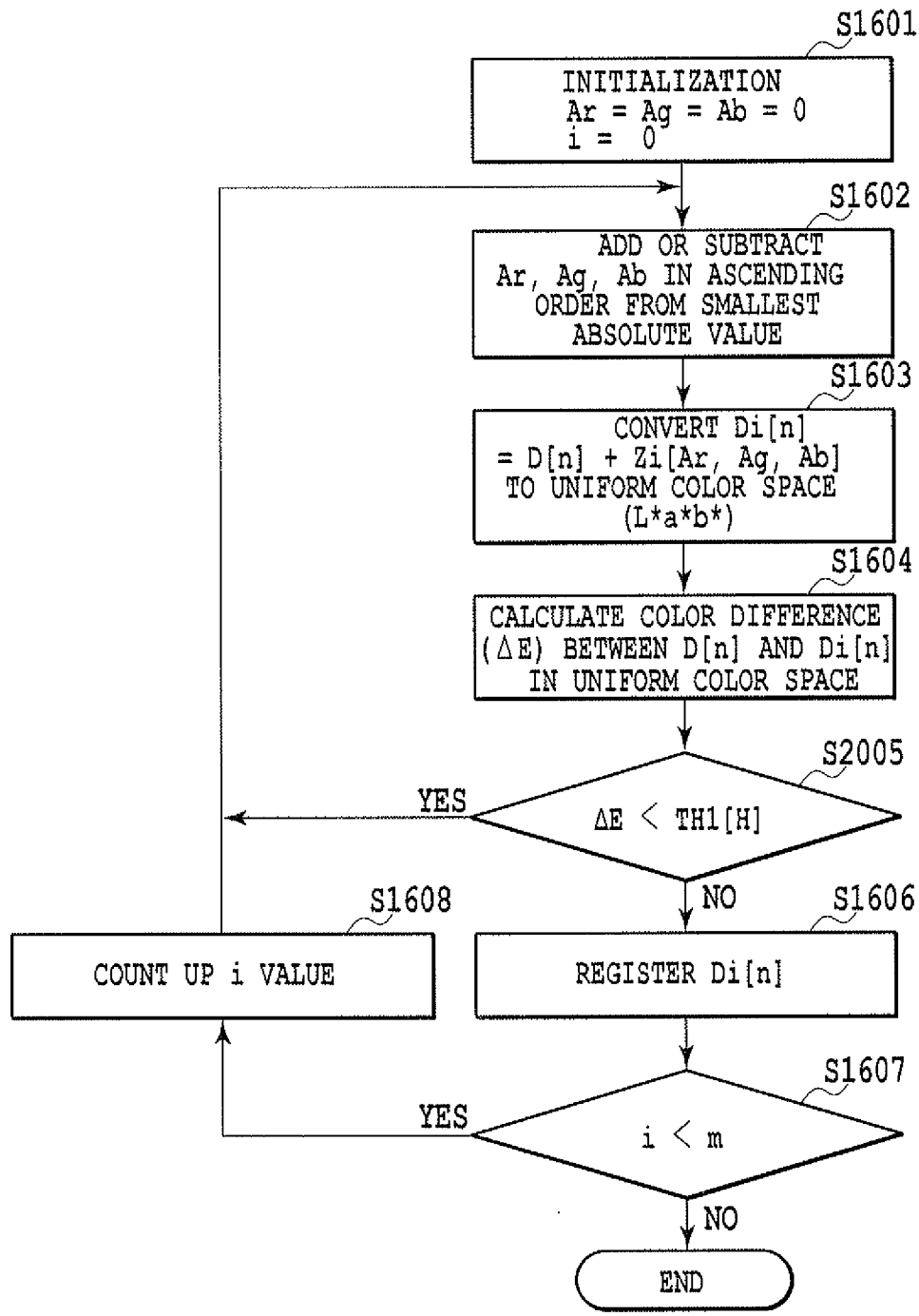
FIG. 22 is a flow chart illustrating a procedure of processing to determine a plurality of candidate correction values according to seventh variation of the first embodiment.

FIG. 22 is a flow chart illustrating a procedure of processing to decide a plurality of candidate correction values according to a seventh variation, which is similar to the processing to decide candidate correction values according to the first embodiment illustrated in FIG. 9.

Processing of the present variation that is different from the processing illustrated in FIG. 9 is the processing in step S2005. The present variation relates to an example in which an intensity of a deviation degree of color unevenness is specified for each position for correction.

In step 92005 of FIG. 22, $\Delta$E of a candidate correction value is compared with a threshold, and in the present variation this threshold TH1 [H] varies depending on a specified intensity of color unevenness. That is, it is not effective to significantly increase the number of candidate colors (candidate patches) whose $\Delta$E is within a predetermined value range on the basis of a visual discrimination threshold. For example, with respect to the intensity of color unevenness, it is inefficient to print a large number of candidate colors whose $\Delta$E is about 1.6 corresponding to "a slight difference" for color unevenness specified to be "strong". Therefore, by setting TH1 [H] to about 3.0 for color unevenness specified to be "strong", a candidate color can be outputted first in a rough interval.

It is also effective for the user to register a deviation degree. That is, since a deviation degree is based on a user's visual perception, it often varies depending on a user. If a user using an image processor is always the same person, it is effective to customize and set a deviation degree.

(Eighth Variation)

In the above embodiment and variations thereof, $\Delta$E, is calculated by adding and subtracting Ar, Ag, Ab in the ascending order from the value whose absolute value is the smallest, but other methods can be applied to the present invention.

For example, a method is also effective in which a predetermined distance from D[n] is set in a Lab space, a value positioned at a predetermined coordinate (for example L1, a1, b1) in the Lab space is converted to a value in an RGB space, and an RGB value that is the most closest to the converted value is found. In this method, a predetermined coordinate can be determined with some freedom. That is, in the above embodiment, $\Delta$E between a candidate color (a patch color) and a color to be corrected is compared with a threshold on the basis of the visual characteristics, and thereby it is determined whether the color is set as a candidate color. That is, determination is made based on whether a distance from the above color to be corrected D[n] is included within a certain sphere in a color space. Meanwhile, in the present variation, since a distance from D[n] can be freely set depending on D [n], a nonsphere can be employed.

That is, as human sensory characteristics, a human visual perception is more sensitive to an amount of change of L than an amount of change of ab in an Lab space. That is, if $\Delta$E is less or equal to 1.6 and $\Delta$L is greater or equal to 0.4, the color may be visually recognized as color, unevenness. In the present variation, since coordinate axes can be freely set, they can be set in such a way that L axis is more finely graduated and a and b axes are rougher graduated than L axis.

Second Embodiment

A second embodiment of the present invention relates to a mode in which the number of candidate correction values or candidate colors (candidate patches), m, varies depending on a nozzle use history that varies depending on a nozzle position.

In the case where color unevenness is caused by variations of ejection characteristics due to a nozzle use history, since the nozzle use history varies depending on a content of a printed image, a use state of each nozzle of a nozzle array may be different from a previously estimated use state.

Figure 23:
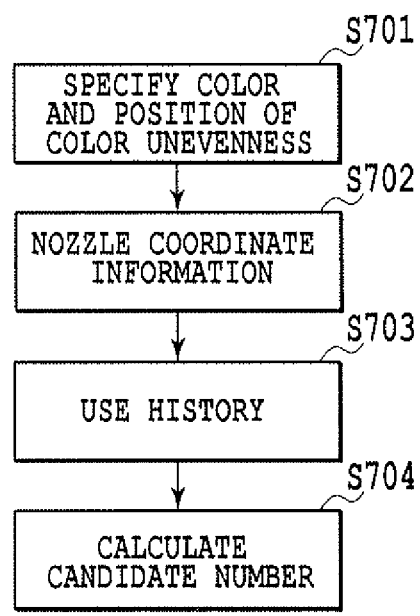
FIG. 23 is a flow chart illustrating processing to determine a number of candidate correction values according to a second embodiment of the present invention.

FIG. 23 is a flow chart illustrating processing to determine the number of candidate correction values according to a second embodiment of the present invention.

In step S701, the color and nozzle position where color unevenness has occurred are specified as described in step S503 in FIG. 5. On the basis of the specified color and nozzle position, information of the specified nozzle position (area information) X (=n) is obtained in step S702. Then, in step S703, a nozzle use history of the specified nozzle position is determined.

Specifically, the number of times of heat (ejection) of the nozzle is counted for each nozzle by a counter. Alternatively, if it is difficult for each nozzle to have a counter, a counter may be provided for each nozzle group composed of a plurality of nozzles. In this case, it is further preferable to provide a nozzle group to be corrected, that is, each area with a counter.

FIG. 24 is an example illustrating the number of times of use (count value) for each nozzle position. In FIG. 24, a horizontal axis indicates information on a nozzle position X and a vertical axis indicates a heat count value. In step S703, a use history (heat count value) is obtained according to the relation between a nozzle position and a counter value illustrated in FIG. 24 on the basis of nozzle position information obtained in step S702.

Furthermore, in step S704, the number of candidate correction values, m[X], is determined from the count value obtained in step S703 by referring to a table indicating the relation between an ejection frequency (in the present example, a count value) and a degree of change of ejection characteristics. By determining a change of ejection characteristics from a nozzle use history in this way, the number of candidate correction values, m, to set a candidate color necessary for correction can be effectively found. For example, if a count value is large, the number of times of use of the nozzle is large and a change of characteristics such as an ejection volume may be large, and therefore the number of candidate correction values is increased.

A mode to find a nozzle use history is not limited to the above example. For example, a paper width or material of a printing medium used for printing can be used. The mode will be described with reference to FIGS. 12A, 12B and 12C. Supposing that L pieces of large size printing paper, M pieces of medium size printing paper and S pieces of small size printing paper are printed using a nozzle array. In this case, in the nozzle array, A region, B region and C region are used for printing L pieces, (L+M) pieces and (L+M+S) pieces, respectively. The number of candidate correction values, m[X], is determined from information of the number of pieces corresponding to a nozzle position X that is obtained in this way, by referring to a previously generated table of information of the number of pieces and a change of nozzle ejection characteristics. This permits effectively obtaining the number of candidate correction values that sets a candidate color necessary for correction without a counter for the number of times of heat of a nozzle or nozzle group. In this case, the number of candidate correction values is increased for a nozzle position having the larger number of pieces.

Furthermore, as another mode to obtain the number of Limes of use of a nozzle, in a state where the number of times of use is distributed to nozzle positions, the number of times of use is obtained, and accordingly the number of candidate correction values is set.

Figure 25A:
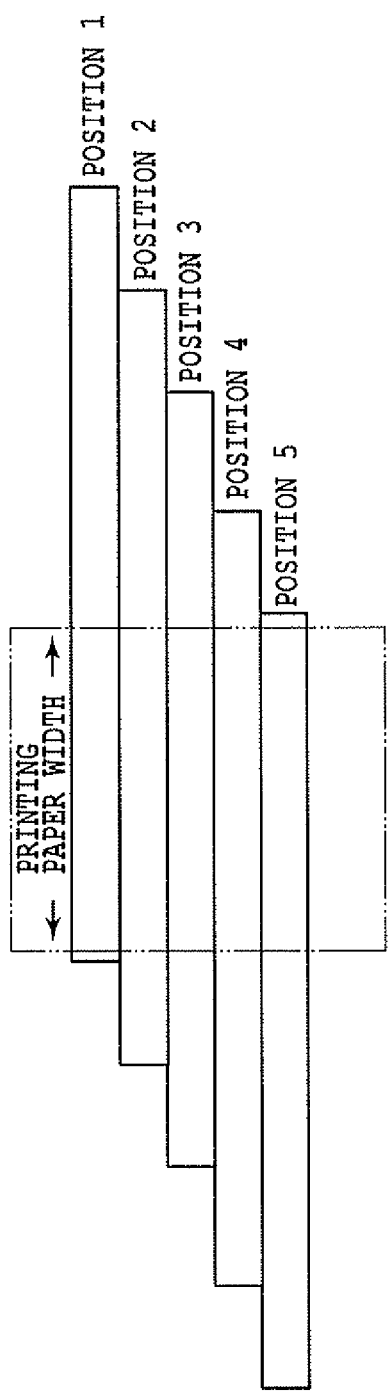
FIGS. 25A and 25B are diagrams illustrating a state in which a position of a printing head (nozzle array) is moved in a predetermined interval relative to a printing paper width, and the number of times of use in the state, respectively.

FIG. 25A illustrates a state in which a position of a printing head (nozzle array) is moved in a predetermined interval relative to a printing paper width, and 25B illustrates the number of times of use in the state. Here, a predetermined interval is any of a time period, the number of pieces of printing and a heat count value or any combination thereof in the present example.

Figure 25B:
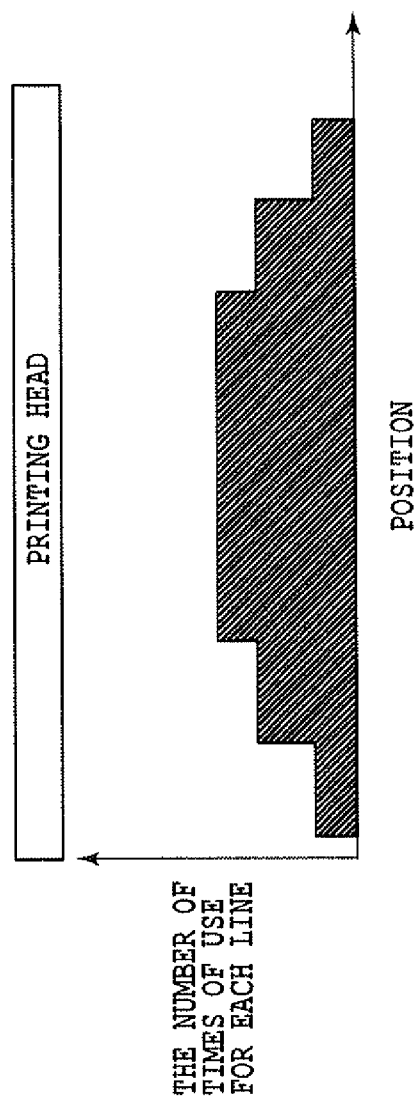

As illustrated in FIG. 25A, if five relative positions are set according to the above predetermined interval, the number of times of use is distributed relative to nozzle positions as illustrated in FIG. 25B. As a result, a degree of nozzle ejection characteristic variations due to nozzle positions is distributed and an ejection characteristic variations due to use corresponding to nozzle positions is reduced.

In this case, also, the number of times of use of nozzles around the center is large and the number of times of use of nozzles reduces in a staircase pattern from the center. The number of candidate correction values, m[X], can be determined on the basis of this information. This brings in effect of distributing a characteristic difference due to a nozzle use frequency and permits effectively obtaining the number of candidate correction values that includes a candidate color necessary for correction in the distributed state.

As another mode, the number of times of use may be determined for respective printing heads corresponding to each of ejecting ink types C, M, Y, K. Then, the number of candidate correction values, m[X], may be determined on the basis of specified color information. In this case, the number of candidate correction value can be determined according to a percentage of ink colors used in a color to be corrected. This permits effectively the number of candidate correction values, m[X], to set a candidate color necessary for correction in the case where a secondary or more color is adjusted.

Any possible combination of the first and second embodiments and variations thereof described above is included in the present invention.

Other Embodiment

The above embodiments relate to generating table parameters in a printer. It should be appreciated that the present invention is not limited to this mode. For example, table parameters may be generated in a host device such as a personal computer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-225747, filed Oct. 5, 2010, which is hereby incorporated by reference herein in its entirety.

What is claimed is:

1. An image processing apparatus for printing an image on a print medium by using a first nozzle array in which a plurality of nozzles for ejecting first ink to the print medium are arranged in a predetermined direction and a second nozzle array in which a plurality of nozzles for ejecting second ink to the print medium are arranged in the predetermined direction, said apparatus comprising:

a first printing control unit constructed to control a plurality of nozzle groups, each of which corresponds to each of a plurality of areas on the print medium and each of which includes respective predetermined number of nozzles arranged in each of the first and second nozzle arrays, to be used for printing images on the plurality of areas based on a color signal representing a predetermined color that is reproduced with at least the first and second inks;

an acquiring unit constructed to acquire information indicating one of the plurality of areas; and a second printing control unit to control the plurality of nozzle groups to be used for printing a color correction image that includes an image to be printed by using nozzles corresponding to the area indicated by the information acquired by said acquiring unit, based on input color correction signal representing a correction color that is acquired by performing color correction to the color signal representing the predetermined color, and an image to be printed by using nozzles other than the nozzles corresponding to the area indicated by the information acquired by said acquiring unit, based on input color signal representing the predetermined color which has not been subjected to the color correction, wherein said second printing control unit controls the plurality of nozzle groups to be used for printing a plurality of the color correction images that differ from each other in the correction color, said second printing control unit determining the number of printed color correction images according to a position of the area corresponding to the information in the plurality of areas.

2. The image processing apparatus according to claim 1, wherein said second printing control unit determines the number of printed color correction images based on ejection characteristics of the nozzle group that corresponds to the area corresponding to the information.

3. The image processing apparatus according to claim 1, being capable of printing an image on each of a plurality of types of print medium whose print width along the predetermined direction differs from each other, wherein in the case where the area corresponding to the information is located on a position corresponding to the print medium that is identified by a first number in the plurality types of print medium, said second printing control unit makes the number of printed color correction images greater than that in the case where the area corresponding to the information has a position corresponding to the print medium which is identified by a second number that is smaller than the first number.

4. The image processing apparatus according to claim 1, wherein in the case where the area corresponding to the information is the area to be printed by using the nozzle group that has a first temperature as a temperature during image printing, said second printing control unit makes the number of printed color correction images greater than that in the case where the area corresponding to the information is the area to be printed by using the nozzle group that has a second temperature as a temperature during image printing, which is lower than the first temperature.

5. The image processing apparatus according to claim 1, wherein in the case where the area corresponding to the information is the area to be printed by using said nozzle group that has a first number representing a use frequency of the nozzle group, said second printing control unit makes the number of printed color correction images greater than that in the case where the area corresponding to the information is the area to be printed by using the nozzle group that has a second number representing a use frequency of said nozzle group, which is smaller than the first number.

6. The image processing apparatus according to claim 1, further comprising a second acquiring unit constructed to acquire second information on one of the plurality of color correction images that have been printed by said second printing control unit.

7. The image processing apparatus according to claim 1, further comprising a third printing control unit constructed to, in the case of printing the image based on an input color signal representing the predetermined color, control the plurality of nozzle groups to be used for printing the image based on an input color signal representing the correction color that is acquired by performing the color correction corresponding to the second information to the color signal representing the predetermined color, on the area corresponding to the information acquired by said acquisition unit, and for printing the image based on an input color signal representing the predetermined color which has not been subjected to the color correction, on the area other than the area corresponding to the information.

8. The image processing apparatus according to claim 1, further comprising a printing unit provided with the first nozzle array and the second nozzle array.

9. An image processing method for printing an image on a print medium by using a first nozzle array in which a plurality of nozzles for ejecting first ink to the print medium are arranged in a predetermined direction and a second nozzle array in which a plurality of nozzles for ejecting second ink to the print medium are arranged in the predetermined direction, said method comprising:

a first printing control step of controlling a plurality of nozzle groups, each of which corresponds to each of a plurality of areas on the print medium and each of which includes respective predetermined number of nozzles arranged in each of the first and second nozzle arrays, to be used for printing images on the plurality of areas based on a color signal representing a predetermined color that is reproduced with at least the first and second inks;

an acquiring step of acquiring information indicating one of the plurality of areas; and a second printing control step of controlling the plurality of nozzle groups to be used for printing a color correction image that includes an image to be printed by using nozzles corresponding to the area indicated by the information acquired by said acquiring step, based on input color correction signal representing a correction color that is acquired by performing color correction to the color signal representing the predetermined color, and an image to be printed by using nozzles other than the nozzles corresponding to the area indicated by the information acquired in said acquiring step, based on input color signal representing the predetermined color which has not been subjected to the color correction, wherein said second printing control step controls the plurality of nozzle groups to be used for printing a plurality of the color correction images that differ from each other in the correction color, said second printing control step determining the number of printed color correction images according to a position of the area corresponding to the information in the plurality of areas.

10. An image processing apparatus for printing an image on a print medium by using a first nozzle array in which a plurality of nozzles for ejecting first ink to the print medium are arranged in a predetermined direction and a second nozzle array in which a plurality of nozzles for ejecting second ink to the print medium are arranged in the predetermined direction, said apparatus comprising:

a first printing control unit constructed to control a plurality of nozzle groups, each of which corresponds to each of a plurality of areas on the print medium and each of which includes respective predetermined number of nozzles arranged in each of the first and second nozzle arrays, to be used for printing images on the plurality of areas based on a color signal representing a predetermined color that is reproduced with at least the first and second inks;

an acquiring unit constructed to acquire information indicating whether or not one of the plurality of areas is an overlapping portions of nozzle chips on each of which nozzles are arranged; and a second printing control unit to control the plurality of nozzle groups to be used for printing a color correction image that includes an image to be printed by using nozzles corresponding to the area indicated by the information acquired by said acquiring unit, based on input color correction signal representing a correction color that is acquired by performing color correction to the color signal representing the predetermined color, and an image to be printed by using nozzles other than the nozzles corresponding to the area indicated by the information acquired by said acquiring unit, based on input color signal representing the predetermined color which has not been subjected to the color correction, wherein said second printing control unit makes the number of printed color correction images in the case where the area corresponding to the information is the overlapping portion differ from the number of printed color correction images in the case where the area corresponding to the information is an area other than the overlapping portion.

11. The image processing apparatus according to claim 10, wherein said second printing control unit makes the number of printed color correction images in the case where the area corresponding to the information is the overlapping portion smaller than the number of printed color correction images in the case where the area corresponding to the information is the area other than the overlapping portion.

12. The image processing apparatus according to claim 10, further comprising a printing unit provided with the first nozzle array and the second nozzle array.

\* \* \* \* \*